US012510263B2

(12) United States Patent
Zhang et al.

(10) Patent No.: US 12,510,263 B2
(45) Date of Patent: Dec. 30, 2025

(54) AIR CONDITIONER

(71) Applicant: HISENSE (GUANGDONG) AIR CONDITIONING CO., LTD., Guangdong (CN)

(72) Inventors: Jianneng Zhang, Guangdong (CN); Yongping Cao, Guangdong (CN); Xidong Li, Guangdong (CN); Minan Wu, Guangdong (CN); Xiaoqin Wei, Guangdong (CN); Jihua Chen, Guangdong (CN)

(73) Assignee: HISENSE (GUANGDONG) AIR CONDITIONING CO., LTD., Jiangmen (CN)

( * ) Notice: Subject to any disclaimer, the term of this patent is extended or adjusted under 35 U.S.C. 154(b) by 112 days.

(21) Appl. No.: 18/617,902

(22) Filed: Mar. 27, 2024

(65) Prior Publication Data

US 2024/0230142 A1 Jul. 11, 2024

Related U.S. Application Data

(63) Continuation-in-part of application No. 17/364,309, filed on Jun. 30, 2021, now Pat. No. 11,971,180.
(Continued)

(30) Foreign Application Priority Data

Jan. 15, 2019 (CN) .......................... 201910036332.8

(51) Int. Cl.
*F24F 11/88* (2018.01)
(52) U.S. Cl.
CPC ..................................... *F24F 11/88* (2018.01)
(58) Field of Classification Search
CPC .... F24F 1/20; F24F 11/46; F24F 11/88; F24F 1/0003; F24F 11/30
See application file for complete search history.

(56) References Cited

U.S. PATENT DOCUMENTS 11,953,219 B2 * 4/2024 Inoue ....................... F24F 11/32
2009/0077990 A1 * 3/2009 Nakajima ............... F24F 11/62
62/259.1
(Continued)

FOREIGN PATENT DOCUMENTS

CN 1292077 A 4/2001
CN 103163452 A 6/2013
(Continued)

OTHER PUBLICATIONS

International Search Report and Written Opinion dated Oct. 26, 2024 in corresponding International Application No. PCT/CN2024/088706, translated, 16 pages.
(Continued)

*Primary Examiner* — Nelson J Nieves
(74) *Attorney, Agent, or Firm* — MH2 TECHNOLOGY LAW GROUP LLP

(57) ABSTRACT

An air conditioner includes an indoor unit and an outdoor unit. The outdoor unit includes an outdoor-unit main control circuit, an outdoor-unit communication circuit, a power supply control circuit, and an outdoor power supply. The power supply control circuit includes a first loop, a second loop, and a trigger circuit. The first loop is a loop turned on due to control of a power supply control signal for supplying power to the outdoor power supply by a power supply line. The second loop is a loop turned on due to control of a turn-on control signal for supplying power to the outdoor power supply by the power supply line. The trigger circuit is configured to trigger the first loop to be turned on according to the power supply control signal.

20 Claims, 17 Drawing Sheets

Related U.S. Application Data which is a continuation of application No. PCT/CN2020/072309, filed on Jan. 15, 2020.

(56) References Cited

U.S. PATENT DOCUMENTS

| | | | |
|---|---|---|---|
| 2009/0077991 A1* | 3/2009 | Nakajima | F24F 1/0003 62/259.1 |
| 2011/0167861 A1* | 7/2011 | Yamamoto | F24F 11/62 62/331 |
| 2016/0273792 A1 | 9/2016 | Xi et al. | |
| 2017/0063249 A1 | 3/2017 | Seo et al. | |
| 2021/0325055 A1 | 10/2021 | Zhang et al. | |

FOREIGN PATENT DOCUMENTS

| | | |
|---|---|---|
| CN | 202993474 U | 6/2013 |
| CN | 104850023 A | 8/2015 |
| CN | 105066385 A | 11/2015 |
| CN | 204787051 U | 11/2015 |
| CN | 205299834 U | 6/2016 |
| CN | 103163452 B | 8/2016 |
| CN | 106482215 A | 3/2017 |
| CN | 107906697 A | 4/2018 |
| CN | 207281508 U | 4/2018 |
| CN | 108488948 A | 9/2018 |
| CN | 109764503 A | 5/2019 |
| EP | 1036995 A1 | 9/2000 |
| JP | 2010054065 A | 3/2010 |
| JP | 2011144951 A | 7/2011 |
| JP | 2016205687 A | 12/2016 |
| KR | 1020150122477 A | 11/2015 |
| KR | 101919800 B1 | 11/2018 |
| WO | 2017199276 A1 | 11/2017 |

OTHER PUBLICATIONS

International Search Report and Written Opinion dated Apr. 9, 2020 in corresponding International Application No. PCT/CN2020/072309, translated, 15 pages.
First Office Action dated May 6, 2020 in corresponding Chinese Application No. 201910036332.8, translated, 20 pages.
Second Office Action dated Nov. 13, 2020 in corresponding Chinese Application No. 201910036332.8, translated, 11 pages.
First Office Action dated Mar. 25, 2021 in corresponding Chinese Application No. 202080000202.X, translated, 12 pages.
Examination Report No. 1 dated Mar. 29, 2022 in corresponding Australian Application No. 2020209621, 6 pages.
Non-Final Office Action dated Sep. 22, 2023 in U.S Appl. No. 17/364,309, 20 pages.
Notice of Allowance dated Jan. 8, 2024 in parent U.S. Appl. No. 17/364,309, 8 pages.

\* cited by examiner

AIR CONDITIONER

CROSS-REFERENCE TO RELATED APPLICATIONS

This application is a continuation-in-part application of U.S. application Ser. No. 17/364,309, filed on Jun. 30, 2021, this U.S. Application is a continuation application of International Patent Application No. PCT/CN2020/072309, filed on Jan. 15, 2020, which claims priority to Chinese Patent Application No. 201910036332.8, filed on Jan. 15, 2019, which are incorporated herein by reference in their entireties.

TECHNICAL FIELD

The present disclosure relates to the field of control technology, and in particular, to an air conditioner.

BACKGROUND

With a progress of society and a development of science and technology, air conditioners have entered thousands of households. With increasing popularity of air conditioners, users have begun to pay more and more attention to an energy efficiency ratio of the air conditioners. The energy efficiency ratio refers to energy conversion efficiency, and is a ratio of heat output by an air conditioner to electrical energy input to the air conditioner. The greater the energy efficiency ratio is, the more electrical energy the air conditioner saves. At present, environmental protection and energy saving are increasingly pursued, and the energy efficiency ratio of the air conditioner is more and more concerned besides refrigeration and noise reduction. In particular, power consumption of the air conditioner in a standby state is increasingly becoming a focus of attention for users and technicians.

SUMMARY

An air conditioner is provided. The air conditioner includes an indoor unit and an outdoor unit. The indoor unit includes an indoor-unit main control circuit, an indoor-unit communication circuit, and at least one indoor power supply. The indoor-unit main control circuit is configured to control operation of the at least one indoor power supply and the indoor-unit communication circuit and control communication between the outdoor unit and the indoor unit. The indoor-unit communication circuit is connected to a power supply control circuit and an outdoor-unit communication circuit of the outdoor unit through a signal line and configured to communicate with the outdoor unit. The at least one indoor power supply is configured to supply power to the indoor-unit main control circuit and the indoor-unit communication circuit. A live wire terminal of the outdoor unit is connected to a live wire terminal of the indoor unit, and the live wire terminal of the outdoor unit is connected to a live wire of a power supply line. A neutral wire terminal of the outdoor unit is connected to a neutral wire terminal of the indoor unit, and the neutral wire terminal of the outdoor unit is connected to a neutral wire of the power supply line. The outdoor unit includes an outdoor-unit main control circuit, the outdoor-unit communication circuit, the power supply control circuit, and at least one outdoor power supply. The outdoor-unit main control circuit is configured to control operation of the at least one outdoor power supply, the power supply control circuit, and the outdoor-unit communication circuit, and control communication between the outdoor unit and the indoor unit. The outdoor-unit communication circuit is configured to communicate with the indoor unit. The power supply control circuit is disposed in a loop in which the power supply line supplies power to the at least one outdoor power supply, and configured to control the power supply line to supply power to the at least one outdoor power supply by controlling on/off of the loop. The at least one outdoor power supply is configured to supply power to the outdoor-unit main control circuit and the outdoor-unit communication circuit after receiving power supplied by the power supply line. The power supply control circuit includes a first loop, a second loop, and a trigger circuit. The first loop is a loop turned on due to control of a power supply control signal for supplying power to the at least one outdoor power supply by the power supply line. The power supply control signal is a signal sent to the power supply control circuit by the indoor-unit communication circuit through the signal line. The second loop is a loop turned on due to control of a turn-on control signal for supplying power to the at least one outdoor power supply by the power supply line. The turn-on control signal is a signal sent to the power supply control circuit by the outdoor-unit main control circuit after the at least one outdoor power supply is powered-on through the first loop. The first loop and the second loop are connected in parallel, and an impedance of the second loop is less than an impedance of the first loop. The trigger circuit is connected to the signal line and the first loop and configured to trigger the first loop to be turned on according to the power supply control signal.

DETAILED DESCRIPTION

Figure 1:
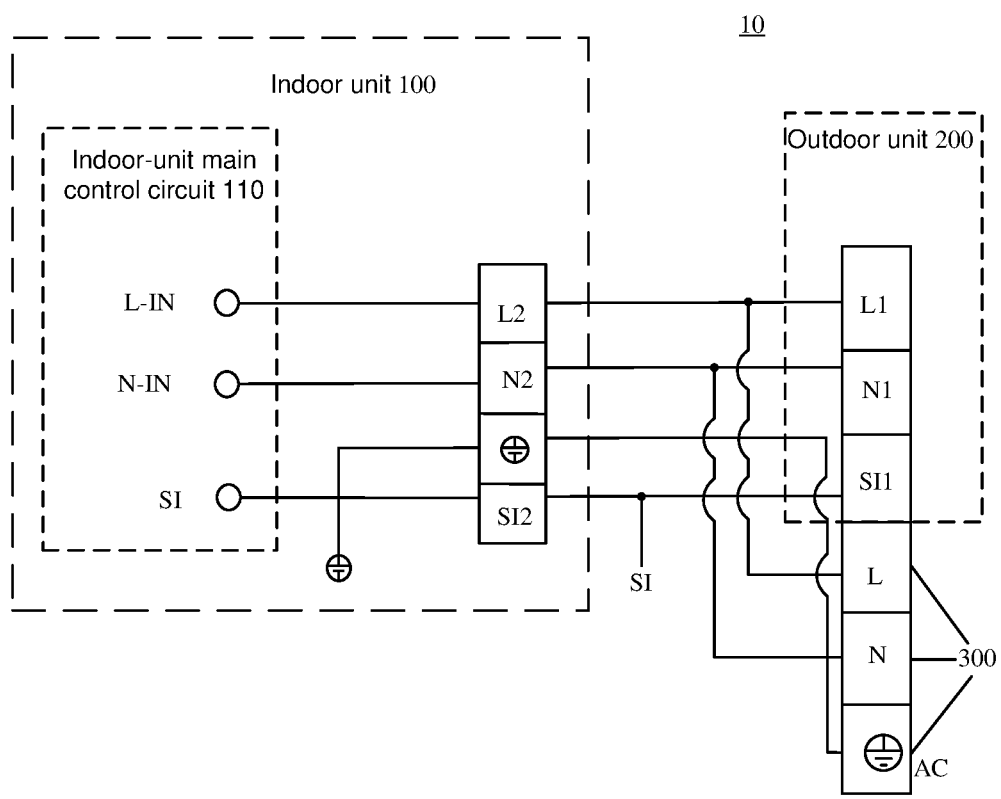
FIG. 1 is a circuit diagram showing connection between an indoor unit and an outdoor unit in an air conditioner in accordance with some embodiments.

Some embodiments of the present disclosure will be described below clearly and completely with reference to the accompanying drawings. However, the described embodiments are merely some but not all embodiments of the present disclosure. All other embodiments obtained based on the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive meaning, i.e., "including, but not limited to." In the description, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms such as "first" and "second" are used for descriptive purposes only and are not to be construed as indicating or implying the relative importance or implicitly indicating the number of indicated technical features. Thus, features defined by "first" or "second" may explicitly or implicitly include one or more of the features. In the description of the embodiments of the present disclosure, the term "a plurality of" or "the plurality of" means two or more unless otherwise specified.

In the description of some embodiments, the terms "coupled" and "connected" and their extensions may be used. The term "connected" should be understood in a broad sense. For example, the term "connected" may represent a fixed connection, a detachable connection, or a one-piece connection, or may represent a direct connection, or may represent an indirect connection through an intermediate medium. For example, the term "coupled" may be used to indicate that two or more components are in direct physical or electrical contact. The term "coupled" or "communicatively coupled" may also mean that two or more components are not in direct contact with each other, but still cooperate or interact with each other. The embodiments disclosed herein are not necessarily limited to the contents herein.

The phrase "at least one of A, B, and C" has the same meaning as the phrase "at least one of A, B, or C," both including the following combinations of A, B, and C: only A, only B, only C, a combination of A and B, a combination of A and C, a combination of B and C, and a combination of A, B, and C.

The phrase "A and/or B" includes the following three combinations: only A, only B, and a combination of A and B.

As used herein, the term "if" is optionally construed as "when" or "in a case where" or "in response to determining" or "in response to detecting", depending on the context. Similarly, the phrase "if it is determined" or "if [the stated condition or event] is detected" is optionally construed as "in a case where it is determined" or "in response to determining" or "in a case where [the stated condition or event] is detected" or "in response to detecting [stated condition or event]", depending on the context.

The use of the phrase "applicable to" or "configured to" herein means an open and inclusive language, which does not exclude devices that are applicable to or configured to perform additional tasks or steps.

The term "about", "substantially" or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

Some embodiments of the present disclosure provide an air conditioner 10. As shown in FIG. 1, the air conditioner 10 includes an indoor unit 100 (also referred to as an air conditioner indoor unit) and an outdoor unit 200 (also referred to as an air conditioner outdoor unit). The indoor unit 100 is disposed indoors, and the outdoor unit 200 may be disposed outdoors. The air conditioner 10 further includes a power supply line 300 for providing the air conditioner 10 with commercial power. The power supply line 300 includes a live wire L, a neutral wire N and a ground wire shown in FIG. 1.

As shown in FIG. 1, the outdoor unit 200 includes a wiring terminal SI1 of an outdoor-unit communication circuit (to be described later), a live wire terminal L1, and a neutral wire terminal N1. The indoor unit 100 includes a wiring terminal SI2 of an indoor-unit communication circuit (to be described later), a live wire terminal L2, and a neutral wire terminal N2. The wiring terminal SI1 of the outdoor-unit communication circuit is connected to the wiring terminal SI2 of the indoor-unit communication circuit through a signal line (SI). The live wire terminal L1 of the outdoor unit 200 is connected to the live wire terminal L2 of the indoor unit 100, and they are jointly connected to the live wire L of the power supply line 300. The neutral wire terminal N1 of the outdoor unit 200 is connected to the neutral wire terminal N2 of the indoor unit 100, and they are jointly connected to the neutral wire N of the power supply line 300. That is, the outdoor unit 200 and the indoor unit 100 may be powered by the same power supply line 300.

Figure 2:
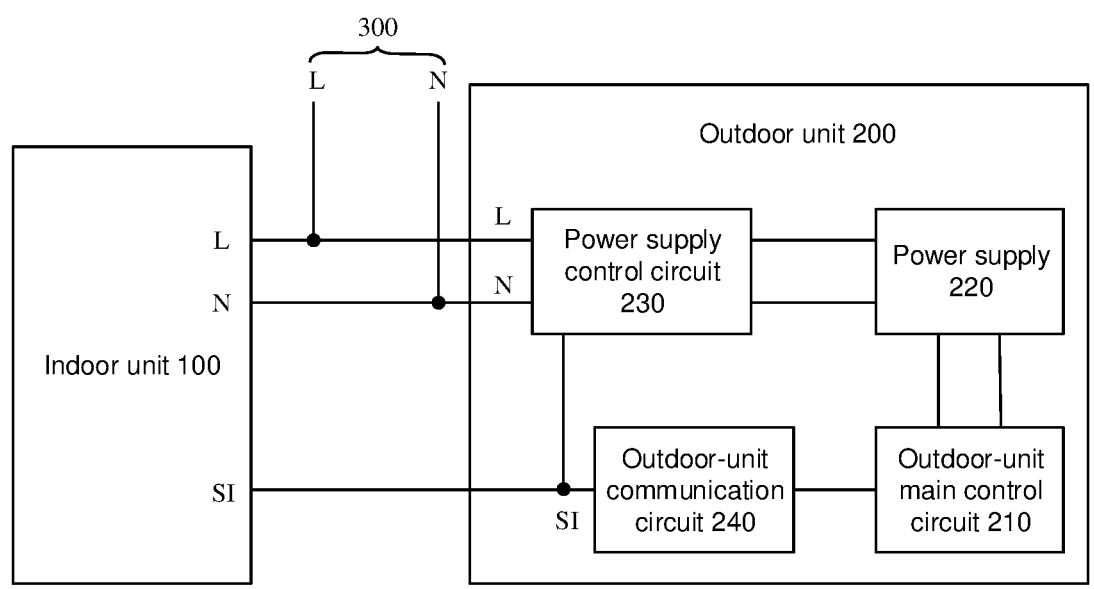
FIG. 2 is a block diagram showing a structure of an outdoor unit in an air conditioner in accordance with some embodiments.

As shown in FIG. 2, the outdoor unit 200 further includes an outdoor-unit main control circuit 210 (also referred to as an outdoor-unit main control board), a power supply 220, a power supply control circuit 230 and an outdoor-unit communication circuit 240.

The outdoor-unit main control circuit 210 is configured to control operation of other modules (e.g., the power supply control circuit 230) of the outdoor unit 200, and to control a communication between the outdoor unit 200 and the indoor unit 100. The outdoor-unit main control circuit 210 may be a control chip or a circuit including a control chip. In some embodiments of the present disclosure, the outdoor-unit main control circuit 210 is further configured to send an open-circuit control signal to the power supply control circuit 230 after the power supply 220 is powered-on.

The power supply 220 is configured to convert a voltage (usually an alternating current (AC) voltage of 220 v) provided by the power supply line 300 into a voltage (e.g., a direct current (DC) voltage of 3.3 v) required by the outdoor-unit main control circuit 210, the outdoor-unit communication circuit 240, and other modules of the outdoor unit 200. In this way, the power supply 220 may supply power to the outdoor-unit main control circuit 210, the outdoor-unit communication circuit 240 and other modules after receiving the power supplied by the power supply line 300.

It will be noted that, the embodiments of the present disclosure do not limit the number or type of the power supply 220 of the outdoor unit 200. The power supply 220 may be a power supply with a function of frequency conversion, voltage transformation or AC/DC conversion. For example, the power supply 220 includes a DC current source or an AC current source. There may be one or more power supplies 220. In a case where there is one power supply 220, the power supply 220 may provide corresponding DC voltages or AC voltages for different circuit devices in the outdoor unit 200 at a same time period or at different time periods. In a case where there is a plurality of power supplies 220, each power supply 220 may provide a corresponding DC voltage or AC voltage for a different circuit device in the outdoor unit 200.

The power supply control circuit 230 is disposed in a loop of the power supply line 300 for supplying power to the power supply 220, and is configured to control whether the power supply line 300 supplies power to the power supply 220 by controlling on/off (i.e., on or off) of the loop, so as to control whether the power supply 220 supplies power to other modules of the outdoor unit 200.

The outdoor-unit communication circuit 240 is connected to the indoor-unit communication circuit through the signal line SI, so as to communicate with the indoor-unit communication circuit, and in turn the communication between the indoor unit 100 and the outdoor unit 200 is achieved. As a result, a command received by the indoor unit 100 may be sent to the outdoor unit 200, or an operation state of the outdoor unit 200 may be sent to the indoor unit 100.

It will be noted that, the power supply control circuit 230 may be a part of the outdoor-unit main control circuit 210, or may be independent of the outdoor-unit main control circuit 210. The outdoor-unit communication circuit 240 may be a part of the outdoor-unit main control circuit 210, or may be independent of the outdoor-unit main control circuit 210. The following contents are described only by taking an example in which the power supply control circuit 230 and the outdoor-unit communication circuit 240 are both independent of the outdoor-unit main control circuit 210.

Figure 3:
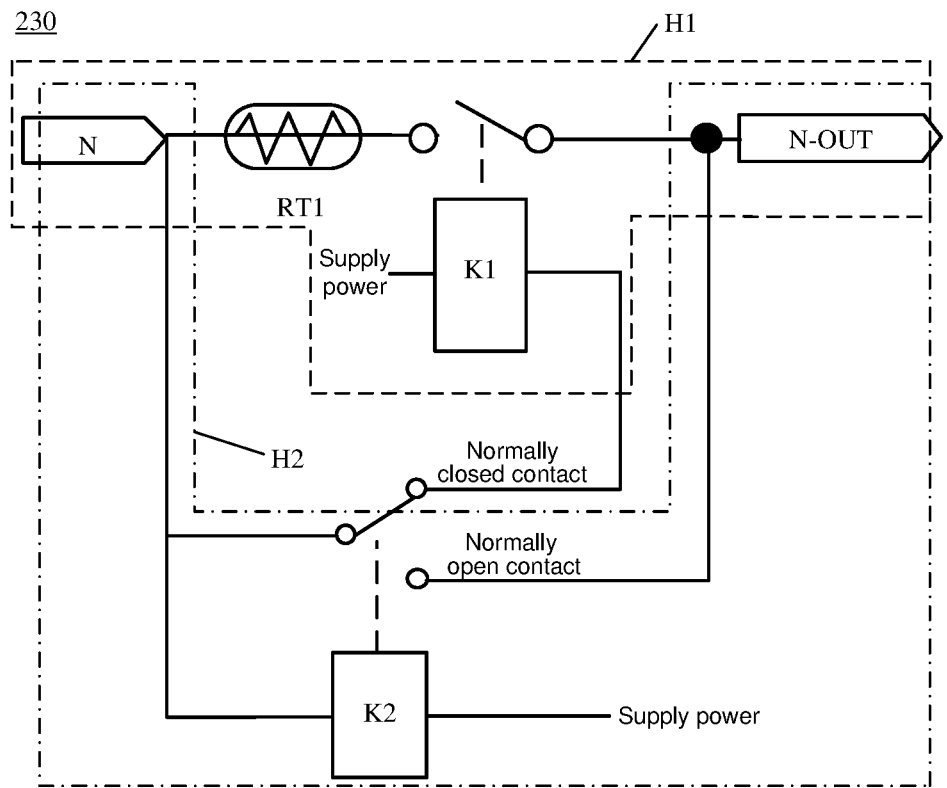
FIG. 3 is a diagram showing a structure of a power supply control circuit in accordance with some embodiments.

It can be seen from the above that, the power supply control circuit 230 is disposed in the loop of the power supply line 300 for supplying power to the power supply 220, and that controlling whether the power supply line 300 supplies power to the power supply 220 is achieved by controlling the state of on or off of the loop. For example, the power supply control circuit 230 is configured to turn on the loop of the power supply line 300 for supplying power to the power supply 220 in response to a power supply control signal (e.g., a predetermined level signal) sent by the indoor unit 100 through the signal line SI, so that the power supply line 300 supplies power to the power supply 220, and in turn the power supply 220 supplies power to each module of the outdoor unit 200. The loop of the power supply line 300 for supplying power to the power supply 220, which is turned on by the power supply control circuit 230 under the control of the power supply control signal, is referred to as a first loop H1 (as shown in FIG. 3).

The predetermined level signal is, for example, a high level lasting for a predetermined time period. The power supply control signal is sent by the indoor unit 100. For example, the power supply control signal may be sent by the indoor-unit communication circuit 130 (shown in FIG. 6), or may be sent by other modules of the indoor unit and transmitted to the signal line SI through the indoor-unit communication circuit 130, which is not limited in the embodiments of the present disclosure. Turning on of the first loop H1 may be maintained by the power supply control signal. For example, the first loop H1 is maintained to be turned on when there is the predetermined level signal, and the first loop H1 is turned off after the predetermined level signal disappears.

Since the signal line SI is a line for the communication between the indoor unit 100 and the outdoor unit 200, and if the power supply control signal (the predetermined level signal, e.g. a high level signal) is always maintained in the signal line SI to maintain a turn-on state of the first loop H1, other communications between the outdoor unit and the indoor unit will be affected. Therefore, after the first loop H1 is turned on to enable the power supply 220 to be powered-on, the power supply control circuit 230 further needs to turn on a second loop H2 (as shown in FIG. 3) of the power supply line 300 for supplying power to the power supply 220 to replace the first loop H1. Therefore, the power supply control circuit 230 is further configured to turn on the second loop H2 in response to the open-circuit control signal sent by the outdoor-unit main control circuit 210, so that the power is supplied to the power supply 220 through the second loop H2 after the power supply control signal disappears, that is, after the first loop H1 is turned off. The loop of the power supply line 300 for supplying power to the power supply 220, which is turned on by the power supply control circuit 230 under the control of the open-circuit control signal, is referred to as the second loop H2.

It will be noted that, the open-circuit control signal may be sent by the outdoor-unit main control circuit 210, or may be sent by other modules, which is not limited in the embodiments of the present disclosure.

In order to enable the outdoor unit 200 and the indoor unit 100 to communicate normally, the power supply control circuit 230 is further configured to turn off a receiving loop of the power supply control signal from the indoor-unit communication circuit 130 to the power supply control circuit 230 in response to the open-circuit control signal sent by the outdoor-unit main control circuit 210, so that a communication signal sent by the indoor-unit communication circuit 130 through the signal line SI flows to the outdoor-unit communication circuit 240, and does not flow to the power supply control circuit 230; as a result, a purpose of a normal communication between the outdoor unit 200 and the indoor unit 100 is achieved. The power supply control circuit 230 is further configured to turn on the receiving loop of the power supply control signal from the indoor-unit communication circuit 130 to the power supply control circuit 230 in response to a disappearance of the open-circuit control signal, thereby preparing for turning on the first loop H1 again.

In order to achieve functions of the power supply control circuit 230, in some embodiments of the present disclosure, as shown in FIG. 3, a circuit structure of the power supply control circuit 230 is provided. The power supply control circuit 230 includes a switch-type relay K1 and a normally closed changeover-type relay K2. The switch-type relay K1 is configured to be turned on in response to the power supply control signal sent by the indoor unit 100 through the signal line SI, so that the first loop H1 of the power supply line 300 for supplying power to the power supply 220 is turned on; that is, the first loop H1 between the neutral wire N and a neutral wire terminal N-OUT (the neutral wire terminal which is also indicated by N1 in FIG. 1 is indicated by N-OUT in FIG. 3) of the outdoor unit 200 is turned on. The normally closed changeover-type relay K2 is configured to switch a movable contact from being connected to a normally closed contact to being connected to a normally open contact in response to the open-circuit control signal sent by the outdoor-unit main control circuit 210, thereby turning off a loop of the signal line SI for supplying power to the switch-type relay K1 to turn off the first loop H1 of the power supply line 300 for supplying power to the power supply 220, and turning on the second loop H2 of the power supply line 300 for supplying power to the power supply 220, i.e., turning on the second loop between the neutral wire N and the neutral wire terminal N-OUT of the outdoor unit 200. Operation states of the switch-type relay K1 and the normally closed changeover-type relay K2 may both be changed by supplying power to them or not.

There are various manners of supplying power to the switch-type relay K1, and different manners of supplying power correspond to different structures of the power supply control circuit 230. Two different structures of the power supply control circuit 230 will be illustrated below, and the manner of supplying power to the switch-type relay K1 will be explained.

Figure 4:
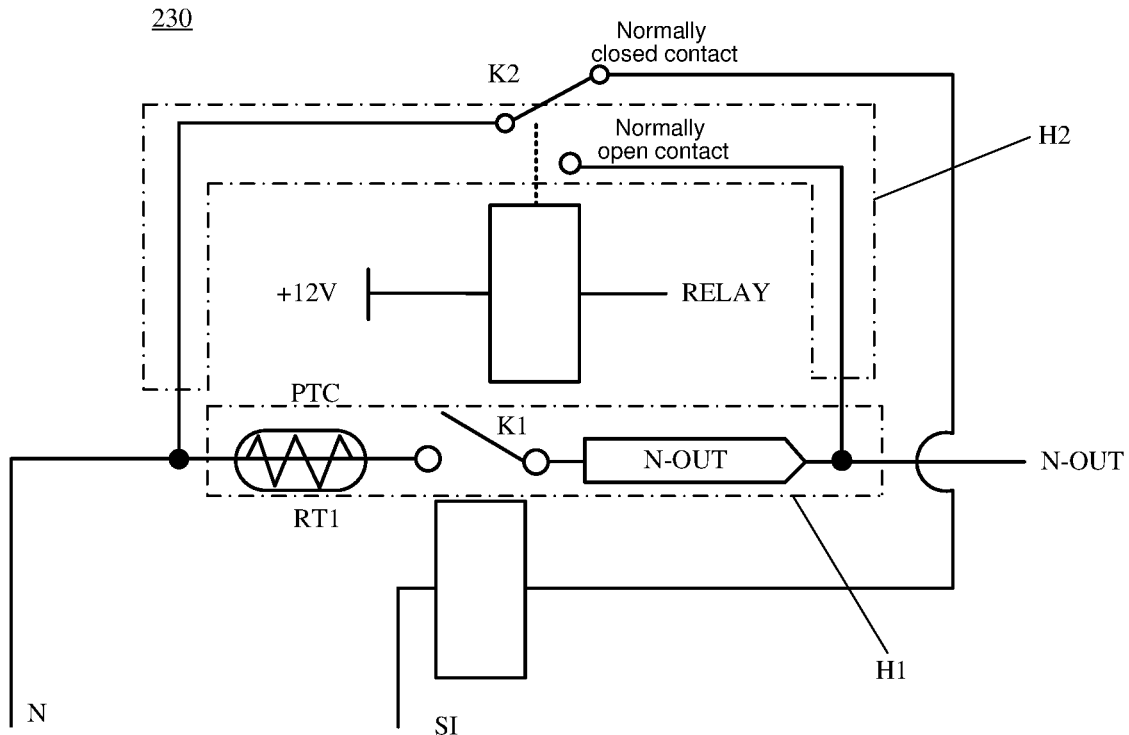
FIG. 4 is a diagram showing another structure of a power supply control circuit in accordance with some embodiments.

In some embodiments, the switch-type relay K1 may be powered by the signal line SI, so that a loop for supplying power the switch-type relay K1 is turned on through the signal line SI. The switch-type relay K1 is configured to be turned on in response to the power supply control signal sent by the indoor unit 100 through the signal line SI, so that the first loop H1 of the power supply line 300 for supplying power to the power supply 220 is turned on. For example, the power supply control circuit 230 adopts the circuit structure shown in FIG. 4 to implement the manner. As shown in FIG. 4, one end of the normally open contact of the switch-type relay K1 is connected to the neutral wire N of the power supply line 300 through a positive temperature coefficient (PTC) resistor RT1, and the other end thereof is connected to the neutral wire terminal N-OUT of the outdoor unit 200. One end of a coil of the switch-type relay K1 is connected to the signal line SI, and the other end thereof is connected to the normally closed contact of the normally closed changeover-type relay K2. The movable contact of the normally closed changeover-type relay K2 is connected to the neutral wire N, and the normally open contact thereof is connected to the neutral wire terminal N-OUT of the outdoor unit 200. The power supply of a coil of the normally closed changeover-type relay K2 is controlled by the outdoor-unit main control circuit 210. The indoor unit 100 sends the power supply control signal to the coil of the switch-type relay K1 through the signal line SI, so that the normally open contact of the switch-type relay K1 is turned on, and the movable contact of the normally closed changeover-type relay K2 is connected to the normally closed contact thereof. As a result, the first loop H1 between the neutral wire N of the power supply line 300 and the neutral wire terminal N-OUT of the outdoor unit 200 is turned on.

Figure 5:
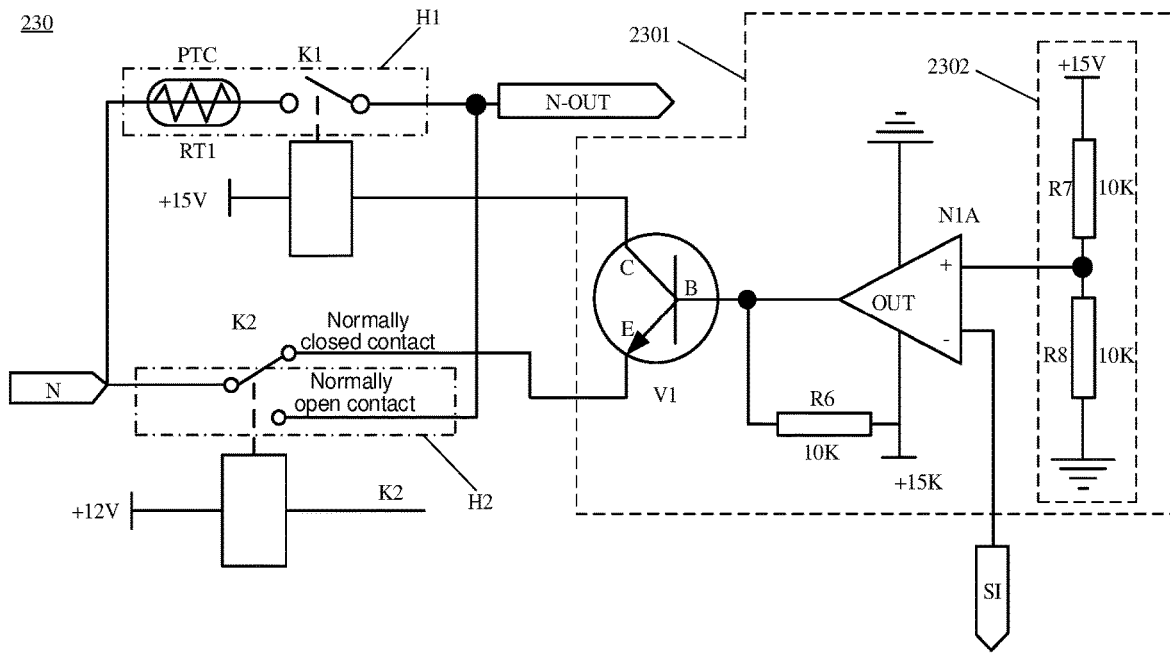
FIG. 5 is a diagram showing another structure of a power supply control circuit in accordance with some embodiments.

In some embodiments, as shown in FIG. 5, the power supply control circuit 230 further includes a level signal supply circuit 2301. The level signal supply circuit 2301 is configured to supply an operation level signal (e.g., a high level signal) to the switch-type relay K1 in response to the power supply control signal sent by the indoor unit 100 through the signal line SI, so that the loop for supplying power the switch-type relay K1 is turned on. The switch-type relay K1 is configured to be turned on in response to the operation level signal sent by the level signal supply circuit 2301, so as to turn on the first loop H1 of the power supply line 300 for supplying power to the power supply 220.

For example, the power supply control circuit 230 may adopt the circuit structure shown in FIG. 5 to implement the manner. The level signal supply circuit 2301 includes a comparator circuit NIA, a triode circuit V1, and a voltage divider circuit 2302. As shown in FIG. 5, the comparator circuit NIA includes a positive input terminal (+), a negative input terminal (−), and an output terminal (OUT). The triode circuit V1 includes a base electrode (B), a collector electrode (C), and an emitter electrode (E). The positive input terminal (+) of the comparator circuit NIA is configured to receive a preset voltage supplied by the voltage divider circuit 2302, the negative input terminal (−) thereof is used to receive the power supply control signal sent by the indoor unit 100 through the signal line SI, and the output terminal (OUT) is connected to the base electrode (B) of the triode circuit V1. The comparator circuit NIA is configured to output a high level at the output terminal (OUT) after receiving the power supply control signal sent by the indoor unit 100 through the signal line SI at the negative input terminal (−). The collector electrode (C) of the triode circuit V1 is connected to the coil of the switch-type relay K1, and the emitter electrode (E) thereof is connected to the normally closed contact of the normally closed changeover-type relay K2. The triode circuit V1 is configured to turn on the collector electrode (C) and the emitter electrode (E) after receiving the high level at the base electrode (B) thereof output by the output terminal (OUT) of the comparator circuit NIA, thereby turning on the loop for supplying power to the switch-type relay K1. As shown in FIG. 5, one end of the normally open contact of the switch-type relay K1 is connected to the neutral wire N of the power supply line 300 through a PTC resistor RT1, and the other end thereof is connected to the neutral wire terminal N-OUT of the outdoor unit 200. One end of the coil of the switch-type relay K1 is connected to a reference voltage, and the other end thereof is connected to the collector electrode (C) of the triode circuit V1. The movable contact of the normally closed changeover-type relay K2 is connected to the neutral wire N, the normally open contact thereof is connected to the neutral wire terminal N-OUT of the outdoor unit 200, and the power supply of the coil of the normally closed changeover-type relay K2 is controlled by the outdoor-unit main control circuit 210.

The negative input terminal (−) of the comparator circuit NIA outputs a high level at the output terminal (OUT) after receiving the power supply control signal sent by the indoor unit 100 through the signal line SI, and outputs the high level to the base electrode (B) of the triode circuit V1. The triode circuit V1 is of NPN-type, and the base electrode (B) thereof receives the high level, so that the collector electrode (C) and the emitter electrode (E) are turned on, and in turn the loop for supplying power the switch-type relay K1 is turned on. In this case, the switch-type relay K1 is turned on, the movable contact of the normally closed changeover-type relay K2 and the normally closed contact thereof are turned on, and the first loop H1 between the neutral wire N of the power supply line 300 and the neutral wire terminal N-OUT of the outdoor unit 200 is turned on.

Alternatively, in some embodiments, the negative input terminal (−) of the comparator circuit NIA outputs a low level at the output terminal (OUT) after receiving the power supply control signal sent by the indoor unit 100 through the signal line SI, and outputs the low level to the base electrode (B) of the triode circuit V1. The triode circuit V1 is of PNP-type, and the base electrode (B) thereof receives the low level, so that the collector electrode (C) and the emitter electrode (E) are turned on, and in turn the loop for supplying power the switch-type relay K1 is turned on.

It will be noted that, the above are merely two exemplary descriptions of structures of the power supply control circuit 230 and the manner of supplying power to the switch-type relay K1 under the corresponding structure, and the embodiments of the present disclosure do not limited thereto.

The technical solution for implementing power supply through the power supply control circuit 230 will be further described below with reference to FIGS. 6 to 7. For example, a circuit structure of the indoor unit 100 may be as shown in FIG. 6, and a circuit structure of the outdoor unit 200 may be as shown in FIG. 7.

Figure 6:
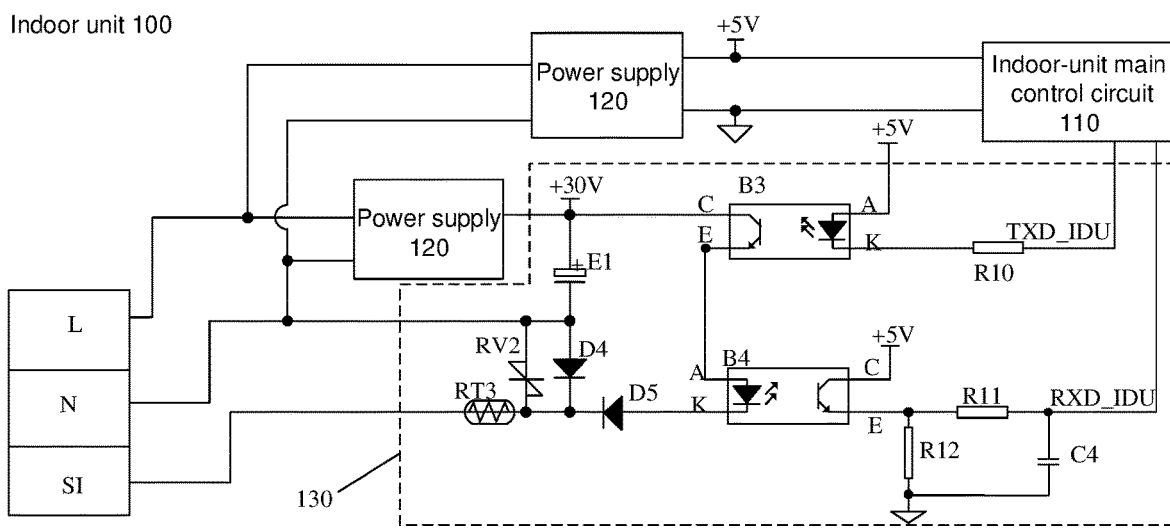
FIG. 6 is a diagram showing a structure of an indoor unit in accordance with some embodiments.

As shown in FIG. 6, the indoor unit 100 includes an indoor-unit main control circuit 110 (also referred to as an indoor-unit main control board), a power supply 120 and an indoor-unit communication circuit 130. The indoor-unit communication circuit 130 includes an optocoupler B3 and an optocoupler B4. The optocoupler B3 is a communication sending terminal (TXD_IDU) of the indoor unit 100, and the optocoupler B4 is the communication receiving terminal (RXD_IDU) of the indoor unit 100. The optocoupler B3 and the optocoupler B4 play a role of isolating signals. The indoor-unit communication circuit 130 further includes a diode D4, a diode D5, a PTC resistor RT3, a varistor RV2, a resistor R10, a resistor R11, a resistor R12, and a capacitor C4. The diode D4 is a reverse freewheeling diode, and plays a role of reverse voltage-withstanding protection. The diode D5 is a forward diode, and plays roles of preventing current from flowing reversely and reverse voltage-withstanding protection. The PTC resistor RT3 plays roles of current limiting and short-circuit overcurrent protection. The varistor RV2 plays a role of surge voltage absorption. The resistor R10 and the resistor R12 play a role of current limiting. The resistor R11 and the capacitor C4 form a RC filter circuit.

Since operation voltages of different circuit devices of the indoor unit 100 may be different, a plurality of different power supplies 120 may be disposed in the indoor unit 100 to supply power to different circuit devices. For example, it is shown in FIG. 6 that a power supply 120 supplying a 5 V voltage required for operation of the indoor-unit main control circuit 110 is separated from a power supply 120 supplying a 30 V voltage required for operation of the indoor-unit communication circuit 130. That is, the 5 V voltage and the 30 V voltage required for operation of the circuit devices may be supplied by different power supplies 120. A specific implementation of supplying power by the power supply 120 will not be described in detail herein, and explanation of the power supply 120 of the indoor unit 100 is similar to explanation of the power supply 220 of the outdoor unit 200.

Figure 7:
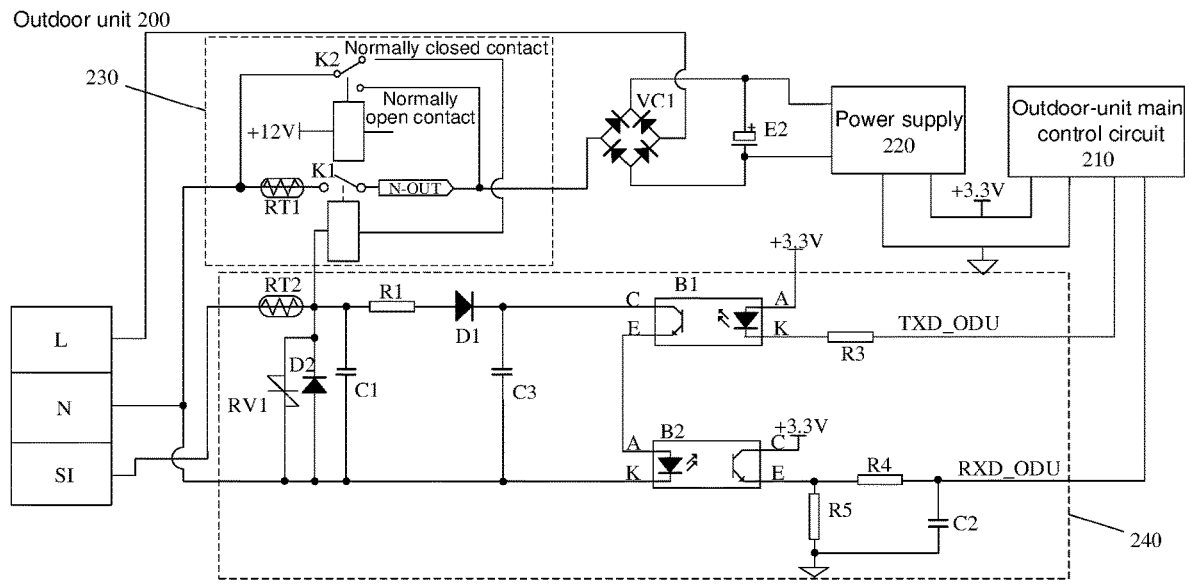
FIG. 7 is a diagram showing a structure of an outdoor unit in accordance with some embodiments.

As shown in FIG. 7, the outdoor-unit communication circuit 240 includes a PTC resistor RT2, a varistor RV1, a diode D1, a diode D2, a resistor R1, a resistor R3, a resistor R4, a resistor R5, a capacitor C1, a capacitor C2, a capacitor C3, and an optocoupler B1 (also referred to as a first optocoupler) and an optical coupler B2 (also referred to as a second optocoupler). The outdoor unit 200 further includes a rectifier bridge VC1 and an electrolytic capacitor E2 at a rear-stage. The PTC resistor RT2 plays roles of current limiting and short-circuit overcurrent protection. The varistor RV1 plays a role of surge voltage absorption. The diode D1 is a forward diode, and plays roles of preventing current from flowing reversely and reverse voltage-withstanding protection. The diode D2 is a reverse freewheeling diode, and plays a role of reverse voltage-withstanding protection. The resistor R1, the resistor R3, and the resistor R5 are current-limiting resistors. The capacitor C1 and the capacitor C3 play a role of filtering. The optocoupler B1 is a communication sending terminal (TXD_IDU) of the outdoor unit, the optocoupler B2 is a communication receiving terminal (RXD_IDU) of the outdoor unit, and the optocoupler B1 and the optocoupler B2 play a role of isolating signals. The resistor R4 and the capacitor C2 form a RC filter circuit.

Similar to the indoor unit 100, since operation voltages of different circuit devices of the outdoor unit 200 may be different, for example, a 3.3 V voltage and a 12 V voltage shown in FIG. 7 are supplied by different power supplies 220. A specific implementation of supplying power by the power supply 220 will not be described in detail herein.

It will be noted that, in FIGS. 6 and 7, a diode includes an anode A and a cathode K. A triode includes a base electrode B, a collector electrode C, and an emitter electrode E.

When the air conditioner 10 is in a standby state, the optocoupler B3 of the indoor unit 100 shown in FIG. 6 stops sending signals, the outdoor-unit main control circuit 210 shown in FIG. 7 is not energized, and the switch-type relay K1 in the power supply control circuit 230 is turned off, the movable contact of the normally closed changeover-type relay K2 and the normally closed contact thereof are turned on. In this case, the first loop H1 and the second loop H2 between the neutral wire N (also referred to as an N wire) and the neutral wire terminal N-OUT of the outdoor unit 200 are both turned off, i.e., the power supply line 300 cannot supply power to the power supply 220, and in turn the power supply 220 cannot supply power to the outdoor-unit main control circuit 210. As a result, the outdoor unit 200 does not generate standby power consumption, so that the power consumption of the air conditioner 10 in the standby state may be greatly reduced.

When the air conditioner 10 needs to be turned on for operation, the indoor-unit main control circuit 110 controls the collector electrode C and the emitter electrode E (hereinafter referred to as CE) of the optocoupler B3 to be turned on through an microcontroller unit (MCU). After the CE of the optocoupler B3 is turned on, a voltage (e.g., 30 V) with the N wire as a reference ground is output to the outdoor unit 200 sequentially through the optocoupler B3, the optocoupler B4, the diode D5, the PTC resistor RT3, and the signal line SI. Then, the voltage of the signal line SI passes through the PTC resistor RT2 of the outdoor unit 200 and reach the coil of the switch-type relay K1, and returns to the N wire through the normally closed contact of the normally closed changeover-type relay K2, thereby forming a closed current loop. In this case, the switch-type relay K1 is turned on (i.e., the first loop H1 is turned on), and the power supply line 300 supplies power to the rectifier bridge VC1 and the electrolytic capacitor E2 at a rear-stage through the PTC resistor RT1 and the normally open contact of the switch-type relay K1, so that the power supply 220 of the outdoor unit 200 is energized to operate.

It will be noted that, the MCU may be the indoor-unit main control circuit 110 itself or a part of the indoor-unit main control circuit 110.

After the power supply 220 of the outdoor unit 200 is energized to operate, it supplies power to the outdoor-unit main control circuit 210. After the outdoor-unit main control circuit 210 is energized, it provides an open-circuit control signal to the power supply control circuit 230. That is, the outdoor-unit main control circuit 210 energizes the coil of the normally closed changeover-type relay K2, so that the coil of the normally closed changeover-type relay K2 switches the movable contact from being connected to the normally closed contact to being connected to a normally open contact, and enables the N wire is connected to the neutral wire terminal N-OUT of the outdoor unit 200 through the second loop. Power is supplied to the rectifier bridge VC1 and the electrolytic capacitor E2 at a rear-stage continuously to maintain the power supply 220 to operate, thereby ensuring a reliable power supply in the outdoor unit 200. Since the normally closed contact of the normally closed changeover-type relay K2 is turned off, the loop for supplying power to the coil of the switch-type relay K1 is turned off, so that the switch-type relay K1 stops operating (i.e., the first loop is turned off). After the normally closed changeover-type relay K2 is energized, a current signal of the signal line SI flows to the outdoor-unit communication circuit 240. That is, the current signal flows to the optocoupler B1 and the optocoupler B2 through the current-limiting resistor R1 and the forward diode D1 of the outdoor-unit communication circuit 240, so that a communication loop between the indoor-unit communication circuit 130 and the outdoor-unit communication circuit 240 is turned on, and a voltage of the signal line SI is switched between high and low levels with a communication square wave signal. As a result, the indoor-unit main control circuit 110 and the outdoor-unit main control circuit 210 of the air conditioner 10 enter a normal operation state, so that other communication data may be transmitted between the indoor-unit communication circuit 130 and the outdoor-unit communication circuit 240.

Figure 8:
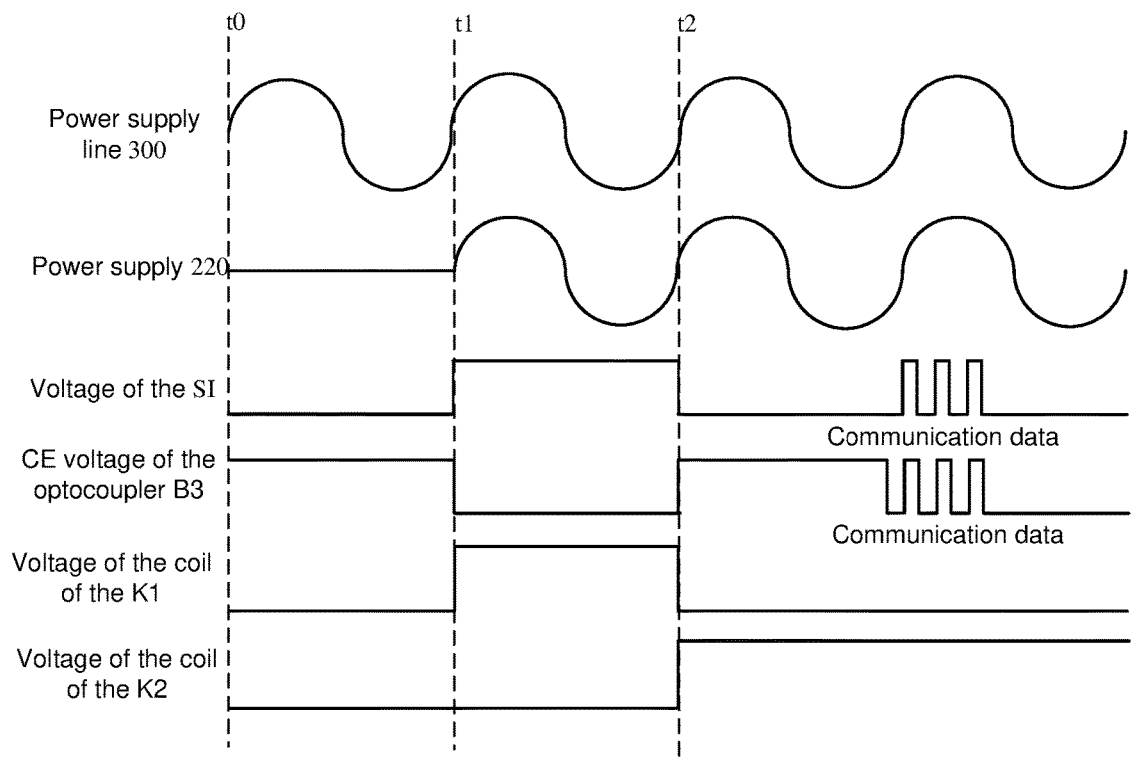
FIG. 8 is a schematic diagram showing an operation timing logic in a startup process of an air conditioner in accordance with some embodiments.

As for an operation timing logic of the circuit during the operation of the air conditioner 10, reference may be made to FIG. 8.

As shown in FIG. 8, the power supply line 300 always has a commercial power with an alternating current. A period t0-t1 is a period during which the optocoupler B3 is turned off, and a CE voltage of the optocoupler B3 is at a high level during this period. During the period t0-t1, the indoor-unit communication circuit 130 does not transmit the power supply control signal to the power supply control circuit 230 of the outdoor unit 200 through the signal line SI, thus the voltage of the signal line SI is at a low level during this period. The switch-type relay K1 and the normally closed changeover-type relay K2 are not energized during the period t0-t1, so that the voltage of the coils of both are at a low level. In addition, the first loop H1 and the second loop H2 of the power supply line 300 for supplying power to the power supply 220 are turned off, and the power supply 220 is not powered-on, so that the voltage of the power supply 220 is 0.

During the period t1-t2, the optocoupler B3 is turned on, and the CE voltage of the optocoupler B3 is at a low level during this period, so that the indoor-unit communication circuit 130 transmits the power supply control signal to the power supply control circuit 230 of the outdoor unit 200 through the signal line SI; the voltage of the signal line SI is at a high level, so that the switch-type relay K1 is energized, the first loop H1 of the power supply line 300 for supplying power to the power supply 220 is turned on, and the power supply 220 starts to be powered on and then supplies power to the outdoor-unit main control circuit 210. At a time t2, the outdoor-unit main control circuit 210 sends an open-circuit control signal to the power supply control circuit 230, the normally closed changeover-type relay K2 is energized, and the voltage of the coil of the normally closed changeover-type relay K2 changes from at a low level to at a high level, so that the second loop H2 of the power supply line 300 for supplying powered to the power supply 220 is turned on; moreover, the switch-type relay K1 is powered-off, and the voltage of the coil of the switch-type relay K1 changes from at a high level to at a low level. After the switch-type relay K1 is powered-off, the voltage of the signal line SI also changes from at a high level to at a low level; thereafter, the signal line SI may transmit other communication data.

Figure 9:
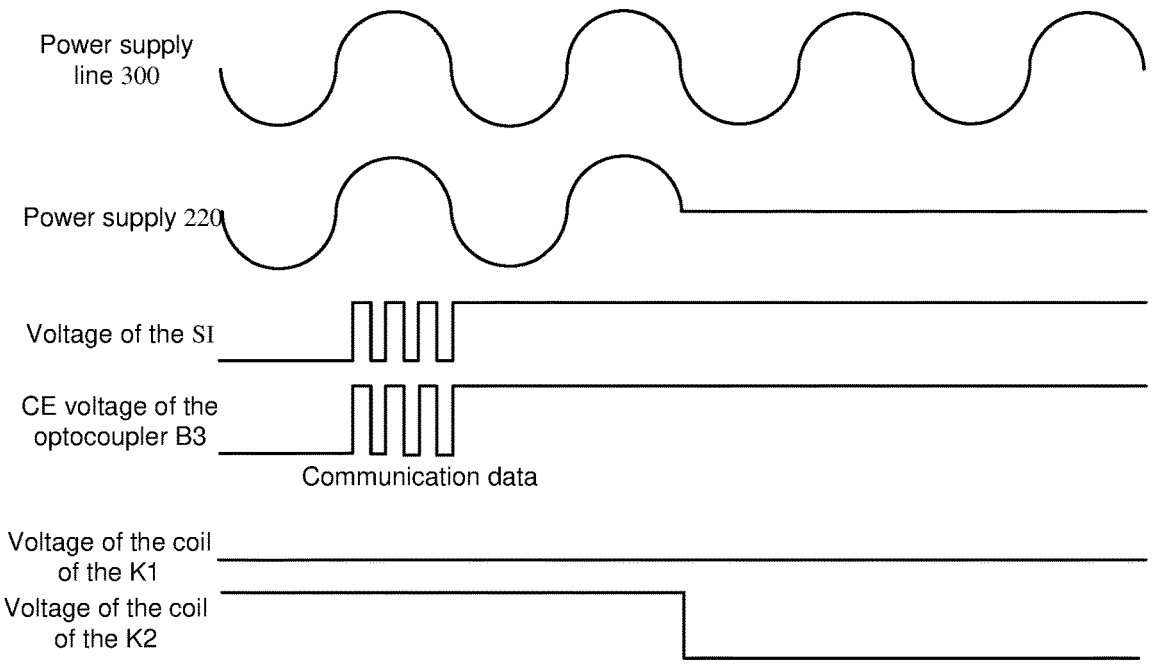
FIG. 9 is a schematic diagram showing an operation timing logic in a shutdown process of an air conditioner in accordance with some embodiments.

When the air conditioner receives a shutdown command, the optocoupler B3 of the indoor unit 100 stops sending signals, the outdoor-unit main control circuit 210 stops supplying power to the normally closed changeover-type relay K2, and the normally closed changeover-type relay K2 switches the movable contact from being connected to the normally open contact to being connected to the normally closed contact, so as to disconnect the N wire and the neutral wire terminal N-OUT of the outdoor unit 200 (i.e., the second loop H2 is turned off). Since the optocoupler B3 is turned off at this time and no current flows through the switch-type relay K1, the switch-type relay K1 maintains a powered-off state. The outdoor-unit main control circuit 210 is deenergized and stops operating, and waits for a next startup command. As for an operation timing logic of the circuit in this process, reference may be made to FIG. 9.

Figure 10:
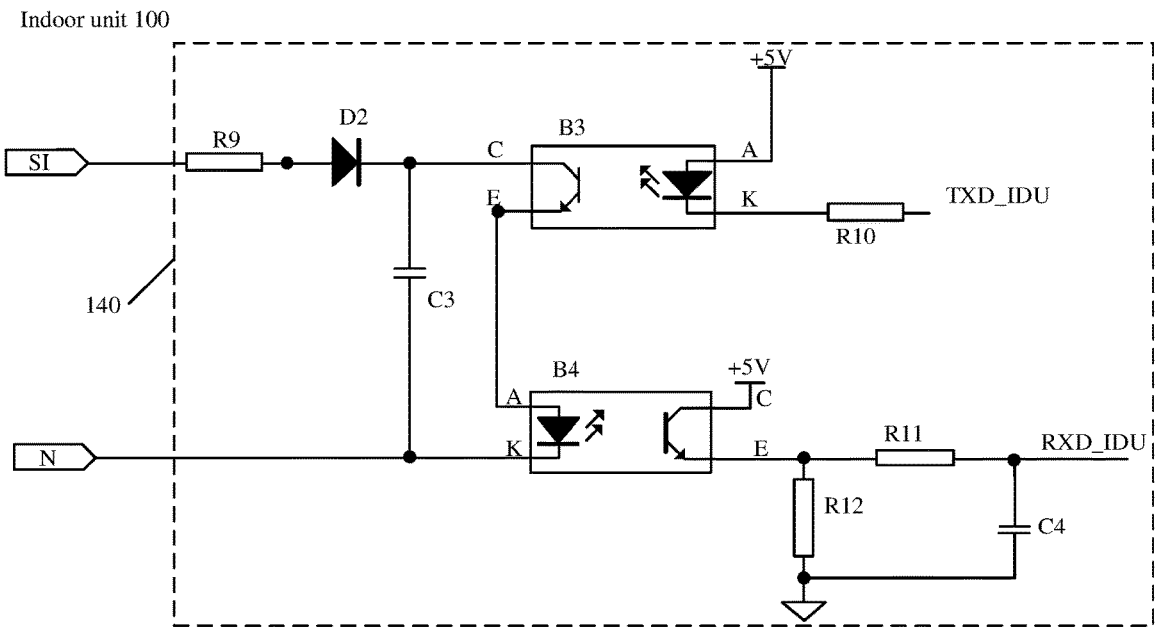
FIG. 10 is a diagram showing another structure of an indoor unit in accordance with some embodiments.
Figure 11:
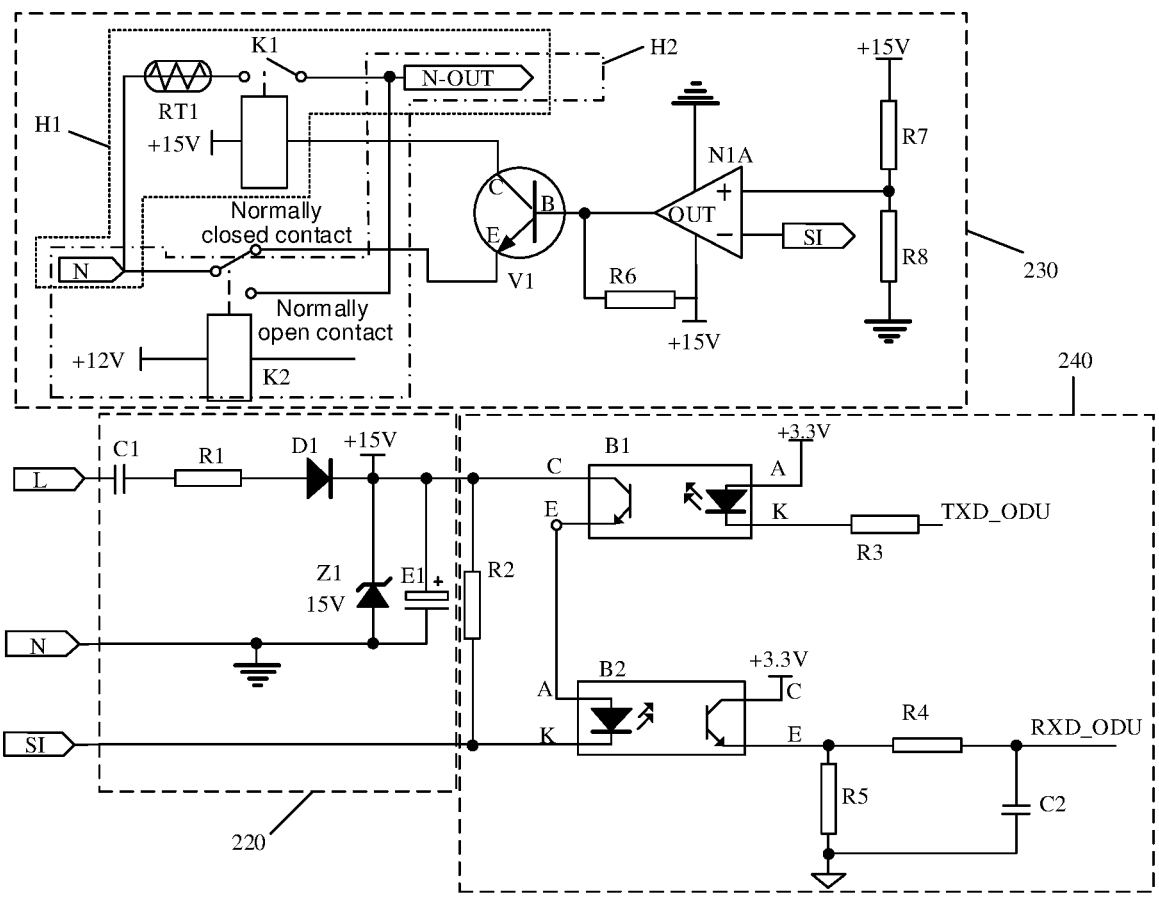
FIG. 11 is a diagram showing another structure of an outdoor unit in accordance with some embodiments.

In some other embodiments of the present disclosure, a circuit structure of the indoor unit 100 may be as shown in FIG. 10, and a circuit structure of the outdoor unit 200 may be as shown in FIG. 11.

As shown in FIG. 10, the indoor-unit communication circuit 130 includes a resistor R9, a resistor R10, a resistor R11, a resistor R12, a diode D2, a capacitor C3, a capacitor C4, an optocoupler B3, and an optocoupler B4. The resistor R9, the resistor R10, and the resistor R12 are current-limiting resistors. The diode D2 plays a role of reverse voltage-withstanding protection. The capacitor C3 plays a role of filtering. The optocoupler B3 is a communication sending terminal (TXD_IDU) of the indoor unit 100, the optocoupler B4 is a communication receiving terminal (RXD_IDU) of the indoor unit 100, and the optocoupler B3 and the optocoupler B4 play a role of isolating signals. The resistor R11 and the capacitor C4 form a RC filter circuit.

As shown in FIG. 11, the power supply control circuit 230 includes a switch-type relay K1, a normally closed changeover-type relay K2, a comparator circuit NIA, a triode circuit V1, a resistor R6, a resistor R7, a resistor R8, and a PTC resistor RT1 and other components. The power supply 220 includes a capacitor C1, a resistor R1, a diode D1, a voltage stabilizing diode Z1, and a voltage stabilizing capacitor E1. The outdoor-unit communication circuit 240 includes components such as an optocoupler B1 (also referred to as a first optocoupler), an optocoupler B2 (also referred to as a second optocoupler), a resistor R3, a resistor R4, a resistor R5 and a capacitor C2.

The capacitor C1, the resistor R1 and the diode D1 form a resistance-capacitance step-down half-wave rectifier circuit; the voltage stabilizing diode Z1 and the voltage stabilizing capacitor E1 form a voltage stabilizing circuit; and a power of a stabilizing voltage at, for example, 15 V, is generated with the N wire as the reference ground by the power supply 220. The optocoupler B1 is a communication sending terminal (TXD_IDU) of the outdoor unit, the optocoupler B2 is a communication receiving terminal (RXD_IDU) of the outdoor unit, and the optocoupler B1 and the optocoupler B2 play a role of isolating signals. The resistor R2 plays a role of voltage division. The resistor R3 and the resistor R5 play a role of current limiting. The resistor R4 and the capacitor C2 form a RC filter circuit.

A positive input terminal (+) of the comparator circuit N1A of the power supply control circuit 230 may be input, for example, a constant level of 7.5 V, which is generated by a voltage divider circuit composed of the resistor R7 and the resistor R8. A negative input terminal (−) of the comparator circuit N1A receives the signal sent by the signal line SI. The resistor R6 is a pull-up resistor of an output terminal (OUT) of the comparator circuit N1A. The output terminal (OUT) of the comparator circuit N1A controls a base electrode (a B electrode) of the NPN-type triode circuit V1. The triode circuit V1 may control the on or off of the switch-type relay K1. The PTC resistor RT1 limits an impact current when the outdoor unit 200 is energized. When the coil of the normally closed changeover-type relay K2 is not energized, the movable contact is connected to the normally closed contact, so that the N wire is connected to an emitter electrode (an E electrode) of the triode circuit V1. The movable contact is connected to the normally open contact when the coil of the normally closed changeover-type type relay K2 operates, so that the N wire is connected to the neutral wire terminal N-OUT of the outdoor unit 200, and power is supplied to the power supply 220.

When the air conditioner 10 is in a standby state, the outdoor-unit main control circuit 210 is not energized, the optocoupler B1 has no power signal, and the CE terminal of the optocoupler B1 is turned off. The optocoupler B3 of the indoor-unit communication circuit 130 does not receive the startup command and is also in a turn-off state. At this time, a voltage of the signal line SI is equal to an output voltage of the voltage stabilizing diode Z1 (e.g., 15 V), and a voltage of the positive input terminal (+) of the comparator circuit N1A is 7.5 V. The negative input terminal (−) of the comparator circuit receives the 15 V voltage of the signal line SI, which is higher than the 7.5 V voltage of the positive input terminal (+), so that the comparator circuit N1A outputs a low level, and the CE terminal of the triode circuit V1 cannot be turned on, and in turn the switch-type relay K1 cannot be energized to operate. As a result, the first loop H1 between the N wire and the neutral wire terminal N-OUT of the outdoor unit 200 is not turned on, the power supply line 300 cannot supply power to the power supply 220, and then the power supply 220 cannot supply power to the outdoor-unit main control circuit 210, thus the outdoor-unit main control circuit 210 does not generate the standby power consumption.

Figure 12:
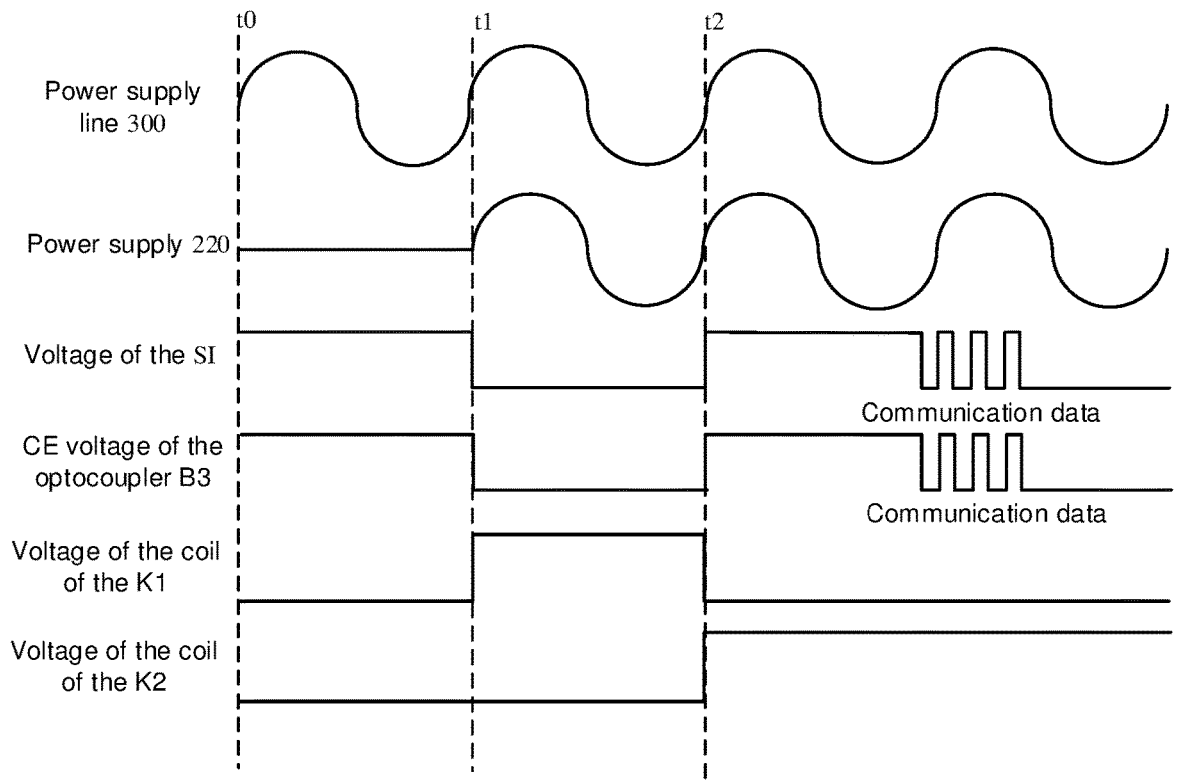
FIG. 12 is a schematic diagram showing another operation timing logic in a startup process of an air conditioner in accordance with some embodiments.

When the air conditioner 10 needs to be turned on for operation, the indoor-unit main control circuit 110 controls the CE terminal of the optocoupler B3 to be turned on through the MCU. Due to voltage division effect of the resistor R2 and the resistor R9, the voltage of the signal line SI is changed to 5 V (15 V×5 K/15 K), that is, the voltage input to the negative input terminal (−) of the comparator circuit N1A is changed to 5 V. At this time, the voltage of the positive input terminal (+) of the comparator circuit N1A is still 7.5 V. Since the 7.5 V voltage of the positive input terminal (+) of the comparator circuit N1A is higher than the 5 V voltage of the negative input terminal (−) thereof, the output terminal (OUT) of the comparator circuit N1A outputs a 15 V high level, and the CE terminal of the triode circuit V1 is turned on. The normally open contact of the switch-type relay K1 is turned on, the first loop H1 between the N wire and the neutral wire terminal N-OUT of the outdoor unit 200 is turned on, so that the N wire supplies power to the power supply 220 through the PTC resistor RT1, and the power supply 220 supplies power to the outdoor-unit main control circuit 210. After the outdoor-unit main control circuit 210 is energized to operate, the coil of the normally closed changeover-type relay K2 is energized (i.e., sending the open-circuit control signal to the power supply control circuit 230), so that the movable contact is switched from being connected to the normally closed contact to being connected to the normally open contact, and the connection between the emitter electrode E of the triode circuit V1 and the N wire is turned off. As a consequence, the switch-type relay K1 stops operating, and the first loop H1 is turned off. At the same time, the second loop H2 between the N wire and the neutral wire terminal N-OUT of the outdoor unit 200 is turned on, which is continue to supply power to the power supply 220, thereby ensuring a reliability of power supply of the outdoor unit. Meanwhile, since the movable contact of the normally closed changeover-type relay K2 is disconnected from the normally closed contact, the loop for supplying power to the coil of the switch-type relay K1 is turned off, the switch-type relay K1 stops operating; and the current signal flows to the outdoor-unit communication circuit 240, so as to turn on the communication loop between the indoor-unit communication circuit 130 and the outdoor-unit communication circuit 240; then the indoor-unit main control circuit 110 and the outdoor-unit main control circuit 210 of the air conditioner 10 enter normal operation states, so that other communication data may be transmitted between the indoor-unit communication circuit 130 and the outdoor-unit communication circuit 240. As for an operation timing logic of the circuit in this process, reference may be made to FIG. 12.

Figure 13:
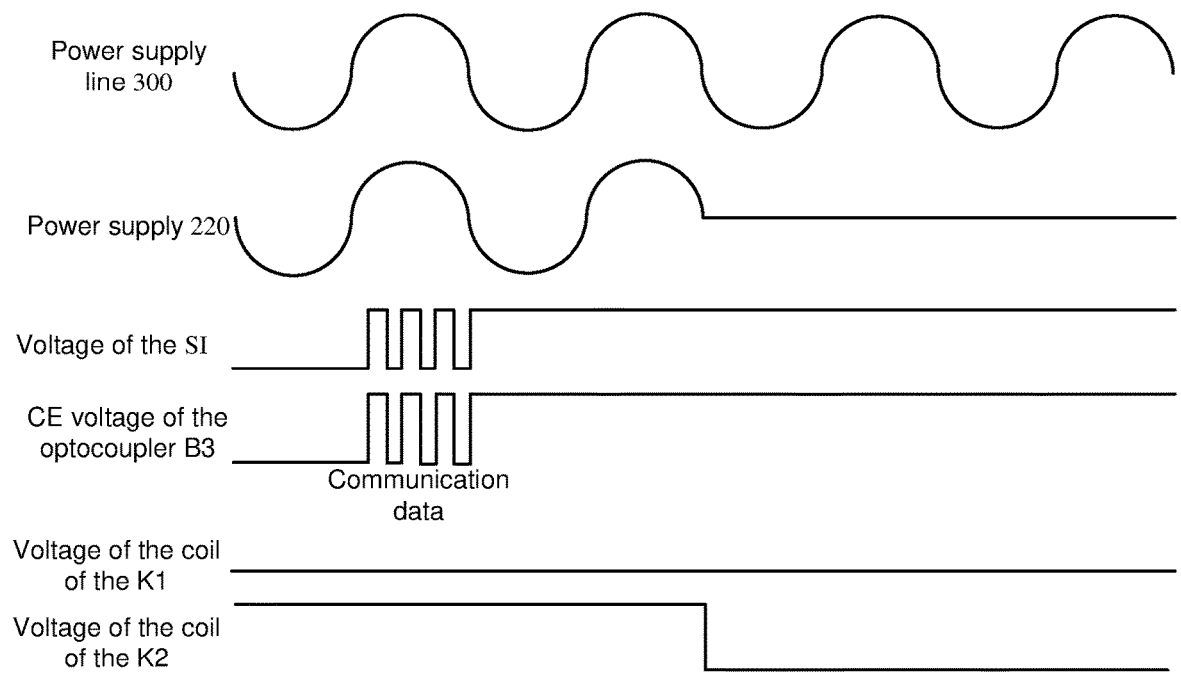
FIG. 13 is a schematic diagram showing another operation timing logic in a shutdown process of an air conditioner in accordance with some embodiments.

When the air conditioner 10 receives a shutdown command, the optocoupler B3 of the indoor unit 100 and the optocoupler B1 of the outdoor unit 200 stop sending signals. The outdoor-unit main control circuit 210 stops supplying power to the normally closed changeover-type relay K2 and the second loop H2 is turned off. Since a voltage from the signal line SI to the negative input terminal (−) of the comparator circuit N1A is 15 V at this time, the switch-type relay K1 is also in an off state. The outdoor-unit main control circuit 210 is deenergized and stops operating, and waits for a next startup command. As for an operation timing logic of the circuit in this process, reference may be made to FIG. 13.

It will be noted that, the above embodiments are all examples of the present disclosure. In actual applications, the power supply control circuit 230 may further include more or fewer circuit devices, which is not limited in the embodiments of the present disclosure.

Other circuits or modules, such as the outdoor-unit main control circuit 210 or the outdoor-unit communication circuit 240, may also include more or fewer circuit devices to implement more or fewer functions. For example, the outdoor-unit main control circuit 210 is further configured to stop sending the open-circuit control signal after the outdoor-unit communication circuit 240 receives the shutdown signal sent by the indoor-unit communication circuit 130. The normally closed changeover-type relay K2 is further configured to switch the movable contact from being connected to the normally open contact to being connected to the normally closed contact after the outdoor-unit main control circuit 210 stops sending the open-circuit control signal, and turn on the loop of the signal line SI for supplying power to the switch-type relay K1.

In the technical solutions provided by some embodiments of the present disclosure, the on or off of the power supply control circuit 230 is able to be controlled through the signal line SI by the indoor unit 100, thereby whether to supply power to the outdoor unit 200 is controlled. Since a voltage (e.g., 30 V) of the signal line SI is low, for example, lower than the voltage provided by the power supply line 300 (usually 220 V), a requirement on diameter of the signal line SI of the air conditioner 10 is low, so that a cost may be reduced, and the reliability of supplying power to the outdoor unit 200 may be ensured.

In the technical solutions provided by some embodiments of the present disclosure, when the air conditioner 10 is in a standby state, the optocoupler B3 of the indoor unit 100 stops sending signals, so as to stop supplying power to the outdoor-unit main control circuit 210, so that the standby power consumption of the air conditioner 10 is reduced. When the air conditioner 10 needs to be turned on for operation, the indoor-unit communication circuit 130 provides a power supply control signal to the power supply control circuit 230 of the outdoor unit 200, so that the first loop H1 of the power supply control circuit 230 is turned on, and the power supply line 300 supplies power to the power supply 220 through the power supply control circuit 230. After the power supply 220 is powered on, it supplies power to the outdoor-unit main control circuit 210. The energized outdoor-unit main control circuit 210 sends an open-circuit control signal to the power supply control circuit 230, so that the first loop H1 is turned off, the second loop H2 is turned on, and the power supply line 300 continues to supply power to the power supply 220. At this time, the current signal output by the signal line SI flows to the outdoor-unit communication circuit 240 instead of the power supply control circuit 230. In this way, while ensuring the reliability of the power supply of the power supply 220, the communication connection between the indoor-unit communication circuit 130 and the outdoor-unit communication circuit 240 is also realized, so that the indoor-unit main control circuit 110 and the outdoor-unit main control circuit of the air conditioner 10 enter normal operation states.

Of course, the circuit structures of the indoor unit 100 and the outdoor unit 200 may also be other structures, so as to further reduce a requirement on diameters of cables between the indoor unit 100 and the outdoor unit 200. For example, in a case where the power supply 120 supplying power to the indoor-unit communication circuit 130 has a weak current supply capability, the power supplied by the power supply 220 in the outdoor unit 200 is controlled by a lesser driving current of the signal line SI, so that the indoor-unit communication circuit 130 and the outdoor-unit communication circuit 240 may operate reliably in the driving of lesser driving current. Here, the requirement on diameters of the cables may be understood as parameters such as the number, the diameter, or the length of connecting lines (e.g., power supply cables) between the indoor unit 100 and the outdoor unit 200.

Figure 14:
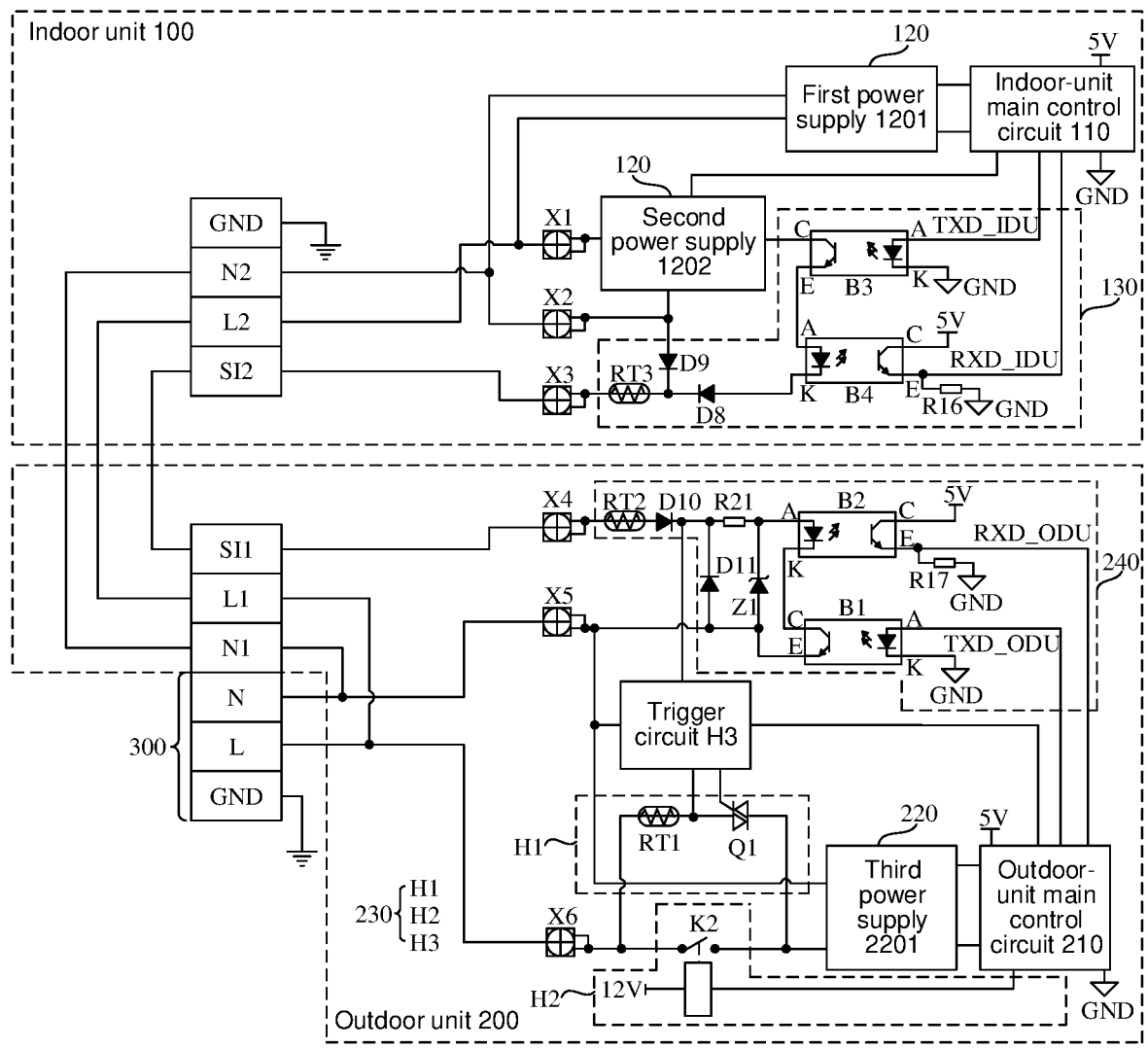
FIG. 14 is a diagram showing a structure of an air conditioner, in accordance with some embodiments.

In some embodiments, as shown in FIG. 14, the power supply line 300 is proximate to the outdoor unit 200, so as to correspond to a manner that power is supplied outdoors of a split-type air conditioner. In this case, the live wire terminal L2 of the indoor unit 100 is connected to the live wire terminal L1 of the outdoor unit 200, and the neutral wire terminal N2 of the indoor unit 100 is connected to the neutral wire terminal N1 of the outdoor unit 200. The live wire terminal L1 of the outdoor unit 200 is connected to the live wire L of the power supply line 300, and the neutral wire terminal N1 of the outdoor unit 200 is connected to the neutral wire N of the power supply line 300. The wiring terminal SI1 of the outdoor-unit communication circuit 240 is connected to the wiring terminal SI2 of the indoor-unit communication circuit 130 through the signal line SI.

It may be construed that the circuit structures in some embodiments of the present disclosure are also applicable to air conditioners with a manner that power is supplied indoors.

In some embodiments, as shown in FIG. 14, the indoor unit 100 includes an indoor-unit main control circuit 110. The indoor-unit main control circuit 110 is configured to control operation of at least one power supply 120 and an indoor-unit communication circuit 130 and control communication between the outdoor unit 200 and the indoor unit 100. The power supply 120 and the indoor-unit communication circuit 130 will be described later.

In some embodiments, as shown in FIG. 14, the indoor unit 100 includes at least one power supply 120 (i.e., an indoor power supply).

At least one power supply 120 is configured to supply power to the indoor-unit main control circuit 110 and the indoor-unit communication circuit 130. Of course, the power supply 120 may further supply power to other different circuit devices in the indoor unit 100, and the present disclosure is not limited thereto.

Figure 15:
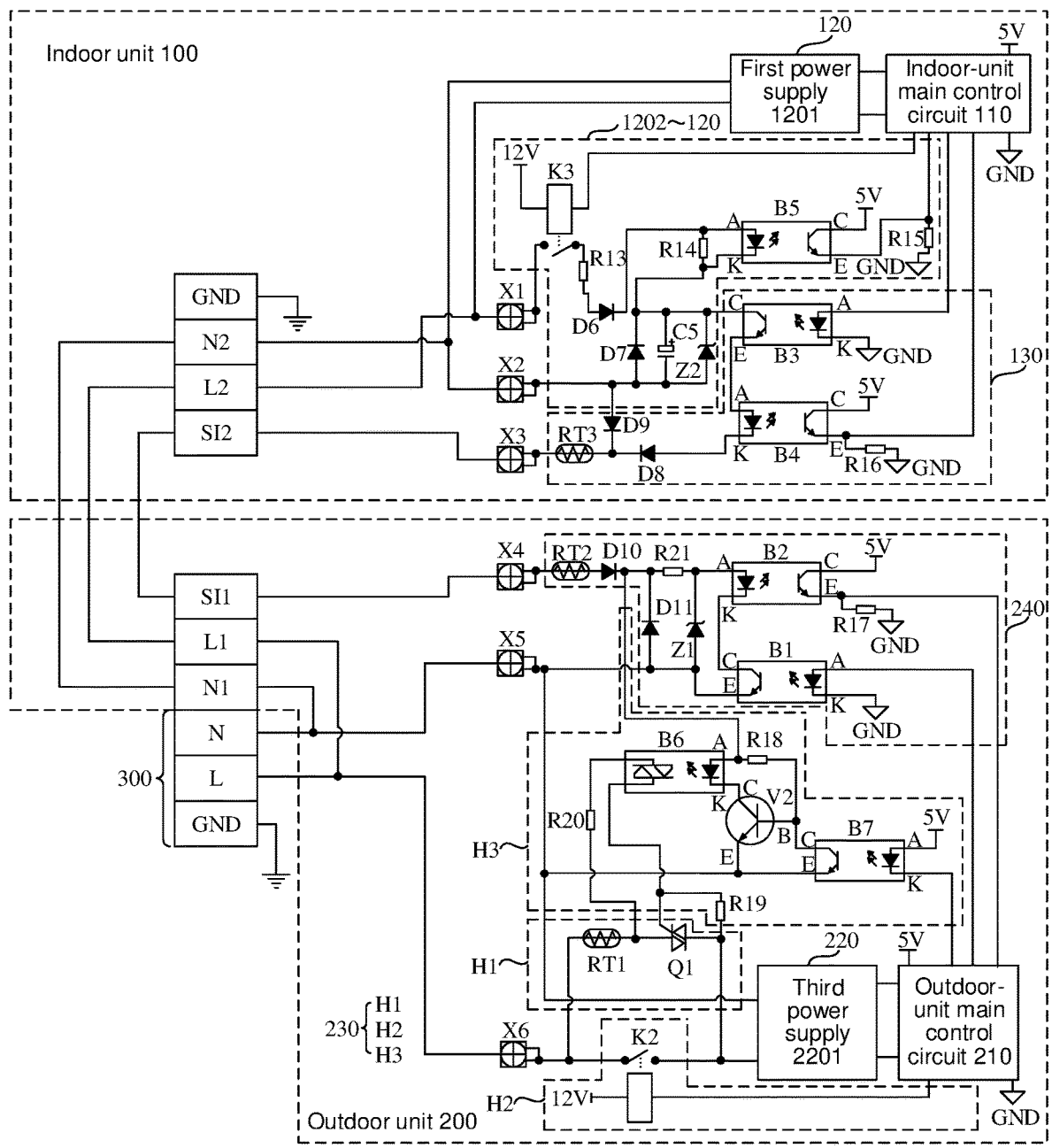
FIG. 15 is a diagram showing another structure of an air conditioner, in accordance with some embodiments.

In some examples, as shown in FIGS. 14 and 15, the at least one power supply 120 includes a first power supply 1201 and a second power supply 1202.

An input terminal of the first power supply 1201 is connected to the live wire terminal L2 and the neutral wire terminal N2 of the indoor unit 100, and an output terminal of the first power supply 1201 is connected to the indoor-unit main control circuit 110. The first power supply 1201 is configured to provide the indoor-unit main control circuit 110 with a voltage required for operation. For example, the first power supply 1201 converts an alternating current (AC) voltage of 220 V with a frequency of 50 HZ into a direct current (DC) voltage of 5 V or 12 V. It may be construed that the first power supply 1201 may output direct current of multiple different voltages.

An input terminal of the second power supply 1202 is connected to the live wire terminal L2 and the neutral wire terminal N2 of the indoor unit 100, and an output terminal of the second power supply 1202 is connected to the indoor-unit communication circuit 130. The second power supply 1202 is configured to provide the indoor-unit communication circuit 130 with a voltage (e.g., 24 v) required for operation.

Figure 16:
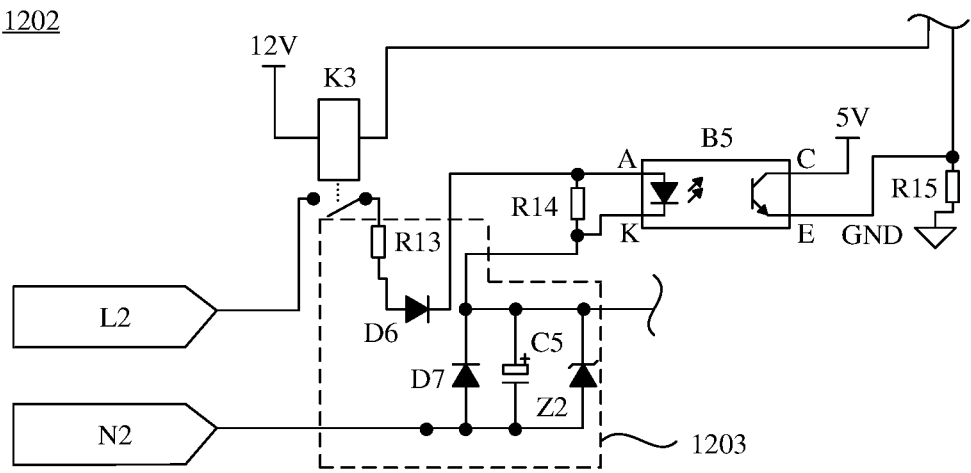
FIG. 16 is a diagram showing a structure of a second power supply, in accordance with some embodiments.

In some embodiments, as shown in FIG. 16, the second power supply 1202 includes a switch-type relay K3 (i.e., a second switch-type relay), a half-wave rectifier circuit 1203, and an optocoupler B5 (i.e., a first optocoupler).

The switch-type relay K3 is disposed in a loop in which the power supply line 300 supplies power to the second power supply 1202 and configured to control on/off of the loop of the second power supply 1202 due to control of the indoor-unit main control circuit 110. For example, an end of a normally open contact of the switch-type relay K3 is connected to the live wire terminal L2 through a first access terminal X1, and another end thereof is connected to an input terminal of the half-wave rectifier circuit 1203. An end of a coil of the switch-type relay K3 is connected to a reference voltage terminal (e.g., the reference voltage terminal supplying a 12 V voltage in FIG. 15) of the indoor unit 100, and anther end thereof is connected to the indoor-unit main control circuit 110.

The input terminal of the half-wave rectifier circuit 1203 is connected to the power supply line 300, and an output terminal of the half-wave rectifier circuit 1203 is connected to the indoor-unit communication circuit 130.

For example, the half-wave rectifier circuit 1203 includes a resistor R13, a diode D6, a diode D7, a capacitor C5, and a voltage stabilizing diode Z2.

The resistor R13 plays roles of voltage reducing and current limiting. An end of the resistor R13 is connected to the another end of the switch-type relay K3, and another end of the resistor R13 is connected to an anode of the diode D6.

Cathodes of the diode D6 and the diode D7 are connected to the indoor-unit communication circuit 130. For example, the cathodes of the diode D6 and the diode D7 are connected to a collector electrode C of a phototriode in an optocoupler B3. An anode of the diode D7 is connected to the neutral wire terminal N2 through a second access terminal X2. The diode D6 and the diode D7 play a role of half-wave rectification. Moreover, the diode D7 further plays roles of one-way isolation and voltage clamping, so as to prevent a high voltage from damaging the communication circuit due to incorrect wiring when the air conditioner 10 is installed.

For example, in a case where the live wire L is mistakenly connected to the neutral wire terminal N2 of the indoor unit 100, the diode D7 may cooperate with a diode D9 to limit a voltage across the optocoupler B3 and a voltage across an optocoupler B4, so as to avoid damage to the optocoupler B3 and the optocoupler B4. Here, the diode D9 will be described later. In addition, the voltage clamping may be understood as limiting a potential of a certain point of a circuit to a specified potential, and the voltage clamping is a voltage-withstanding protection technology.

The capacitor C5 plays roles of energy storage and filtering. An end of the capacitor C5 is connected to a wire between the optocoupler B3 and the cathodes of the diode D6 and the diode D7, so as to be connected to the collector electrode C of the phototriode in the optocoupler B3. Another end of the capacitor C5 is connected to the neutral wire terminal N2.

The voltage stabilizing diode Z2 is connected in parallel with the capacitor C5, and a cathode of the voltage stabilizing diode Z2 is connected to the collector electrode C of the phototriode in the optocoupler B3. The voltage stabilizing diode Z2 plays a role of stabilizing voltage. For example, the voltage stabilizing diode Z2 includes a voltage stabilizing diode stabilizing a voltage at 24 v.

A light-emitting end (i.e., a light-emitting diode) of the optocoupler B5 is disposed in the loop where the power supply line 300 supplies power to the second power supply 1202, and a light-receiving end (i.e., a phototriode) of the optocoupler B5 is connected to the indoor-unit main control circuit 110. The optocoupler B5 is configured to detect a zero crossing signal of the alternating current transmitted by the power supply line 300. That is to say, the optocoupler B5 may detect when the alternating current changes from positive to negative, or from negative to positive. Since the optocoupler B5 is turned on after the alternating current crosses zero and the alternating current voltage rises to exceed a turn-on voltage of the optocoupler B5, the optocoupler B5 may play a role of detecting the zero crossing signal of the alternating current.

For example, as shown in FIGS. 15 and 16, an anode A of the light-emitting diode in the optocoupler B5 is connected to the cathode of the diode D6, a cathode K of the light-emitting diode in the optocoupler B5 is connected to the cathode of the diode D7 and the collector electrode C of the phototriode in the optocoupler B3. A collector electrode C of the phototriode in the optocoupler B5 is connected to a reference voltage terminal (e.g., the reference voltage terminal supplying a 5 V voltage in FIG. 15) of the indoor unit 100, and an emitter electrode E of the phototriode in the optocoupler B5 is connected to the indoor-unit main control circuit 110.

In some embodiments, as shown in FIG. 16, the second power supply 1202 further includes a resistor R14. The resistor R14 (i.e., a second resistor) is connected in parallel with the light-emitting end of the optocoupler B5. For example, two ends of the resistor R14 are connected to the anode A and the cathode K of the light-emitting diode in the optocoupler B5, respectively. The resistor R14 is configured to limit a voltage of the light-emitting end of the optocoupler B5, so as to protect the light-emitting end of the optocoupler B5.

In some embodiments, as shown in FIG. 16, the second power supply 1202 further includes a resistor R15. An end of the resistor R15 is connected to the emitter electrode E of the phototriode in the optocoupler B5, and another end of the resistor R15 is connected to a ground. The resistor R15 plays roles of current limiting and pulling down a level. In this way, in a case where the optocoupler B5 is turned off, a level signal obtained by the indoor-unit main control circuit 110 is at a low level.

Of course, the structure of the second power supply 1202 may also be other structures. For example, the second power supply 1202 includes a resistance-capacitance step-down half-wave rectifier circuit or a switching power supply.

In some embodiments, as shown in FIGS. 14 and 15, the indoor unit 100 further includes an indoor-unit communication circuit 130. The indoor-unit communication circuit 130 is also connected to a power supply control circuit 230 of the outdoor unit 200 through the signal line SI and configured to communicate with the outdoor unit 200 and send a power supply control signal to the power supply control circuit 230. Here, a current value of the power supply control signal may be less than or equal to a first preset value. The first preset value may be less than or equal to 10 mA. It may be construed that the first preset value may also be other values greater than 10 mA. The first preset value is related to the structure of the circuit (e.g., the second power supply 1202) and the types of the electronic elements used in the circuit, and the present disclosure is not limited thereto.

In some embodiments, as shown in FIGS. 14 and 15, the indoor-unit communication circuit 130 includes an optocoupler B3 and an optocoupler B4.

The optocoupler B3 (i.e., a second optocoupler) is a communication sending terminal (TXD_IDU) of the indoor unit 100, and the optocoupler B4 (i.e., a third optocoupler) is a communication receiving terminal (RXD_IDU) of the indoor unit 100. The optocoupler B3 and the optocoupler B4 play a role of isolating signals.

A light-emitting end of the optocoupler B3 is connected to the indoor-unit main control circuit 110, and a light-receiving end of the optocoupler B3 is connected to the output terminal of the second power supply 1202. For example, the collector electrode C of the phototriode in the optocoupler B3 is connected to the output terminal of the second power supply 1202, and an emitter electrode E of the phototriode in the optocoupler B3 is connected to an anode A of a light-emitting diode in the optocoupler B4. An anode A of a light-emitting diode in the optocoupler B3 is connected to the indoor-unit main control circuit 110, and a cathode K of the light-emitting diode in the optocoupler B3 is connected to the ground.

A light-emitting end of the optocoupler B4 is connected to the light-receiving end of the optocoupler B3 and the signal line SI, and a light-receiving end of the optocoupler B4 is connected to the indoor-unit main control circuit 110. For example, a collector electrode C of a phototriode in the optocoupler B4 is connected to a reference voltage terminal (e.g., the reference voltage terminal supplying a 5 V voltage in FIG. 14) of the indoor unit 100, and an emitter electrode E of the phototriode in the optocoupler B4 is connected to the indoor-unit main control circuit 110. The anode A of a light-emitting diode in the optocoupler B4 is connected to the emitter electrode E of the phototriode in the optocoupler B3, and a cathode K of the light-emitting diode in the optocoupler B4 is connected to the signal line SI through the wiring terminal SI2 of the indoor-unit communication circuit 130.

In some embodiments, as shown in FIGS. 14 and 15, the indoor-unit communication circuit 130 further includes a diode D8 and a diode D9. An anode of the diode D8 is connected to the cathode K of the light-emitting diode in the optocoupler B4, and a cathode of the diode D8 is connected to the wiring terminal SI2 of the indoor-unit communication circuit 130. An anode of the diode D9 is connected to the neutral wire terminal N2 of the indoor unit 100, and a cathode of the diode D9 is connected between the cathode of the diode D8 and the wiring terminal SI2 of the indoor-unit communication circuit 130.

The diode D8 and the diode D9 play roles of one-way isolation and voltage clamping, so as to prevent an abnormal high voltage from damaging the communication circuit due to incorrect wiring when the air conditioner 10 is installed. For example, in a case where the live wire L is mistakenly connected to the wiring terminal SI2 of the indoor-unit communication circuit 130, the current cannot flow through the diode D8 in a reverse direction, thereby avoiding damage to the optocoupler B3 and the optocoupler B4.

In some embodiments, as shown in FIGS. 14 and 15, the indoor-unit communication circuit 130 further includes a PTC resistor RT3. The PTC resistor RT3 is connected between the wiring terminal SI2 of the indoor-unit communication circuit 130 and the cathodes of the diodes D8 and D9. For example, an end of the PTC resistor RT3 is connected to the wiring terminal SI2 of the indoor-unit communication circuit 130 through a third access terminal X3, and another end of the PTC resistor RT3 is connected to the cathodes of the diodes D8 and D9.

PTC resistor RT3 plays roles of current limiting and short-circuit overcurrent protection. In a case where there is an abnormally high current, the PTC resistor RT3 may quickly heat up, and a resistance value of the PTC resistor RT3 rapidly increases, so as to rapidly reduce the current, thereby preventing the high current from damaging the communication circuit due to incorrect wiring when the air conditioner 10 is installed. For example, in a case where the live wire L is mistakenly connected to the neutral wire terminal N2 of the indoor unit 100, the resistance value of the PTC resistor RT3 increases to reduce the current, thereby avoiding damage to the diode D9.

In some embodiments, as shown in FIGS. 14 and 15, the indoor-unit communication circuit 130 further includes a resistor R16. An end of the resistor R16 is connected to the emitter electrode E of the phototriode in the optocoupler B4, and another end of the resistor R16 is connected to the ground. The function of the resistor R16 is the same as that of the resistor R15, and details will not be repeated herein.

It will be noted that the 5 V voltage in the indoor-unit communication circuit 130 and the 5 V and 12 V voltages in the second power supply 1202 in FIG. 15 may be supplied by the first power supply 1201.

In some embodiments, as shown in FIGS. 14 and 15, the outdoor unit 200 includes an outdoor-unit main control circuit 210. The outdoor-unit main control circuit 210 is configured to control operation of at least one power supply 220, a power supply control circuit 230, and an outdoor-unit communication circuit 240, and control communication between the outdoor unit 200 and the indoor unit 100. The power supply 220, the power supply control circuit 230, and the outdoor-unit communication circuit 240 will be described later.

In some embodiments, as shown in FIGS. 14 and 15, the outdoor unit 200 further includes an outdoor-unit communication circuit 240. The outdoor-unit communication circuit 240 is configured to communicate with the indoor unit 100.

In some embodiments, as shown in FIGS. 14 and 15, the outdoor-unit communication circuit 240 includes an optocoupler B2 and an optocoupler B1.

The optocoupler B1 is a communication sending terminal (TXD_ODU) of the outdoor unit 200, and the optocoupler B2 is a communication receiving terminal (RXD_ODU) of the outdoor unit 200. The optocoupler B1 and the optocoupler B2 play a role of isolating signals.

A light-emitting end of the optocoupler B1 is connected to the outdoor-unit main control circuit 210, and a light-receiving end of the optocoupler B1 is connected to the neutral wire N and a light-emitting end of the optocoupler B2. For example, a collector electrode C of a phototriode in the optocoupler B1 is connected to a cathode K of a light-emitting diode in the optocoupler B2, and an emitter electrode E of the phototriode in the optocoupler B1 is connected to the neutral wire N through a fifth access terminal X5. An anode A of a light-emitting diode in the optocoupler B1 is connected to the outdoor-unit main control circuit 210, and a cathode K of the light-emitting diode in the optocoupler B1 is connected to the ground.

A light-emitting end of the optocoupler B2 is connected to the signal line SI and the light-receiving end of the optocoupler B1, and a light-receiving end of the optocoupler B2 is connected to the outdoor-unit main control circuit 210. For example, an anode A of the light-emitting diode in the optocoupler B2 is connected to the signal line SI through the wiring terminal SI1 of the outdoor-unit communication circuit 240, and the cathode K of the light-emitting diode in the optocoupler B2 is connected to the collector electrode C of the phototriode in the optocoupler B1. A collector electrode C of a phototriode in the optocoupler B2 is connected to a reference voltage terminal (e.g., the reference voltage terminal supplying a 5 V voltage in FIG. 14) of the outdoor unit 200, and an emitter electrode E of the phototriode in the optocoupler B2 is connected to the outdoor-unit main control circuit 210.

In some embodiments, as shown in FIGS. 14 and 15, the outdoor-unit communication circuit 240 further includes a PTC resistor RT2. An end of the PTC resistor RT2 is connected to the wiring terminal SI1 of the outdoor-unit communication circuit 240 through a fourth access terminal X4, and another end of the PTC resistor RT2 is connected to an anode of a diode D10. The function of the PTC resistor RT2 is the same as that of the PTC resistor RT3. For example, in a case where the live wire L is mistakenly connected to the signal wire SI on an outdoor side, the PTC resistor RT2 quickly heats up, and a resistance value of the PTC resistor RT2 increases rapidly, so as to quickly reduce the current, thereby avoiding damage to the diode D10 and a voltage stabilizing diode Z1.

In some embodiments, as shown in FIGS. 14 and 15, the outdoor-unit communication circuit 240 further includes the diode D10 and a diode D11. A cathode of the diode D10 is connected to a cathode of the diode D11 and an end of a resistor R21. An anode of the diode D11 is connected to the neutral wire terminal N1 of the outdoor unit 200 through the fifth access terminal X5. The diode D10 and the diode D11 play roles of one-way isolation and voltage clamping, so as to prevent an abnormal high voltage from damaging the communication circuit due to incorrect wiring when the air conditioner 10 is installed. For example, in a case where the live wire L is mistakenly connected to the fifth access terminal X5, the current cannot flow through the diode D10 in a reverse direction, and the diode D11 may limit a voltage across the optocoupler B1 and a voltage across the optocoupler B2, thereby avoiding damage to the optocoupler B1 and the optocoupler B2.

In some embodiments, as shown in FIGS. 14 and 15, the outdoor-unit communication circuit 240 further includes the resistor R21. Another end of the resistor R21 is connected to a cathode of the voltage stabilizing diode Z1 and the anode A of the light-emitting diode in the optocoupler B2. The resistor R21 plays a role of current limiting.

In some embodiments, as shown in FIGS. 14 and 15, the outdoor-unit communication circuit 240 further includes the voltage stabilizing diode Z1. An anode of the voltage stabilizing diode Z1 is connected between the anode of the diode D11 and the emitter electrode E of the phototriode in the optocoupler B1. The voltage stabilizing diode Z1 plays a role of voltage clamping, so as to protect the optocoupler B1 and the optocoupler B2.

In some embodiments, as shown in FIGS. 14 and 15, the outdoor-unit communication circuit 240 further includes a resistor R17. An end of the resistor R17 is connected to the emitter electrode E of the phototriode in the optocoupler B2, and another end of the resistor R17 is connected to the ground. The function of the resistor R17 is the same as that of the resistor R15 and the resistor R16, and details will not be repeated herein.

In some embodiments, as shown in FIGS. 14 and 15, the outdoor unit 200 further includes at least one power supply 220 (i.e., an outdoor power supply). The at least one power supply 220 is configured to supply power to the outdoor-unit main control circuit 210 and the outdoor-unit communication circuit 240 after receiving the power supplied by the power supply line 300.

In some embodiments, as shown in FIGS. 14 and 15, the at least one power supply 220 includes a third power supply 2201. An output terminal of the third power supply 2201 is connected to the outdoor-unit main control circuit 210, a first input terminal of the third power supply 2201 is connected to the neutral wire N of the power supply line 300, and a second input terminal of the third power supply 2201 is connected to the power supply control circuit 230 (e.g., a first loop H1 and a second loop H2).

In some embodiments, as shown in FIGS. 14 and 15, the outdoor unit 200 further includes the power supply control circuit 230. The power supply control circuit 230 is disposed in a loop where the power supply line 300 supplies power to the at least one power supply 220 and configured to control the power supply line 300 to supply power to at least one power supply 220 by controlling on/off of the loop.

In some embodiments, as shown in FIGS. 14 and 15, the power supply control circuit 230 includes a first loop H1, a second loop H2, and a trigger circuit H3.

The first loop H1 is a loop turned on due to control of the power supply control signal for supplying power to the power supply 220 (i.e., the third power supply 2201) by the power supply line 300. The second loop H2 is a loop turned on due to control of a turn-on control signal for supplying power to the power supply 220 by the power supply line 300. The turn-on control signal is a signal sent to the power supply control circuit 230 by the outdoor-unit main control circuit 210 after the power supply 220 is powered-on through the first loop H1. An input terminal of the trigger circuit H3 is connected to the signal line SI, and an output terminal of the trigger circuit H3 is connected to the first loop H1. The trigger circuit H3 is configured to trigger the first loop H1 to be turned on according to the power supply control signal.

Here, the half-wave rectifier circuit 1203 has a limited power supply capacity, and in order to fully charge the capacitor C5, a period when the optocoupler B3 is turned on is short. Therefore, the power supply control signal is at a high level for a short period (e.g., 2 ms), and a current value of the power supply control signal is low.

In some embodiments, as shown in FIG. 14, the first loop H1 includes a PTC resistor RT1 and a thyristor Q1. An end of the PTC resistor RT1 is connected to the live wire L through a sixth access terminal X6, and another end of the PTC resistor RT1 is connected to a first electrode of the thyristor Q1. The function of the PTC resistor RT1 is similar to that of the PTC resistor RT3 and the PTC resistor RT2, and details will not be repeated herein.

A second electrode of the thyristor Q1 is connected to the second input terminal of the third power supply 2201, and a gate of the thyristor Q1 is connected to the output terminal of the trigger circuit H3. The thyristor Q1 is configured to be turned on due to control of a trigger signal of the trigger circuit H3, so that the first loop H1 may be turned on and the power supply line 300 may supply power to the third power supply 2201.

Figure 17:
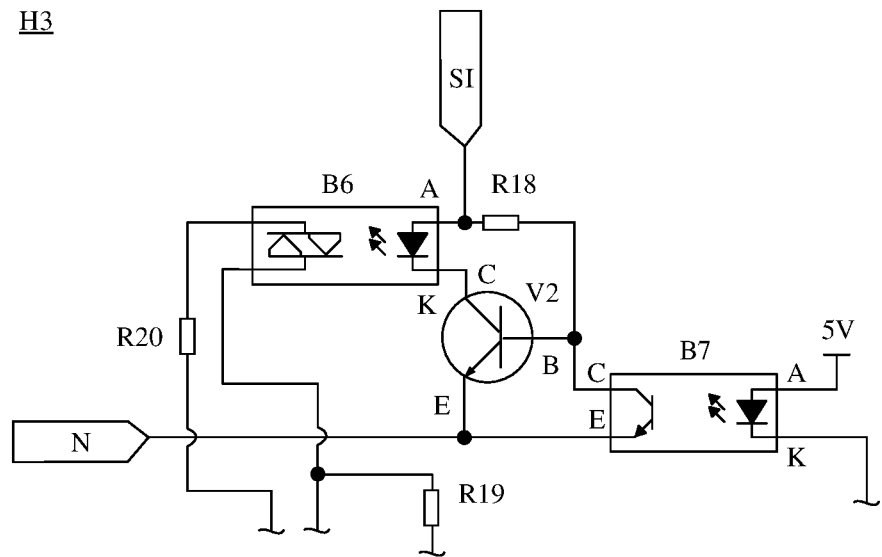
FIG. 17 is a diagram showing a structure of a trigger circuit, in accordance with some embodiments.

In some embodiments, as shown in FIGS. 15 and 17, the trigger circuit H3 includes a triac optocoupler B6, a triode V2, a resistor R18, a resistor R19, a resistor R20, and an optocoupler B7.

A light-receiving end (i.e., a triac) of the triac optocoupler B6 is connected to the gate of the thyristor Q1, and the triac optocoupler B6 is configured to be turned on according to the power supply control signal sent by the indoor unit 100 through the signal line SI, so as to trigger the first loop H1 to be turned on (i.e. thyristor Q1 being turned on).

For example, a first electrode of the triac in the triac optocoupler B6 is connected to the another end of the PTC resistor RT1 through the resistor R20, and a second electrode of the triac in the triac optocoupler B6 is connected to the gate of the thyristor Q1. An anode A of a light-emitting diode in the triac optocoupler B6 is connected to the signal line SI, and a cathode K of the light-emitting diode in the triac optocoupler B6 is connected to a collector electrode C of the triode V2. Here, the resistor R20 plays a role of current limiting.

A base electrode B of the triode V2 is connected to the signal line SI and a light-receiving end of the optocoupler B7, the collector electrode C of the triode V2 is connected to the light-emitting end of the triac optocoupler B6, and an emitter electrode E of the triode V2 is connected to the neutral wire N. For example, the base electrode B of the triode V2 is connected to the signal line SI through the resistor R18, the collector electrode C of the triode V2 is connected to the cathode K of the light-emitting diode in the triac optocoupler B6, and the emitter electrode E of the triode V2 is connected to the neutral wire N through the fifth access terminal X5. In a case where the indoor unit 100 sends the power supply control signal through the signal line SI, the triode V2 may be turned on, so as to control the light-receiving end of the triac optocoupler B6 to be turned on.

Here, the resistor R18 (i.e., a first resistor) is configured to bias a voltage of the base electrode B of the triode V2 and limit a current flowing into the optocoupler B7 (i.e., a fourth optocoupler). A resistance value of the resistor R18 is greater than or equal to a second preset value (i.e., a preset value). For example, the second preset value is greater than or equal to 100 K. In this way, in a case where the optocoupler B7 is turned on, a current value of the current flowing through the resistor R18 and the optocoupler B7 may be low. Here, the term "bias" may be understood as providing a set DC voltage or a set DC current to the electronic elements in the circuit.

A light-emitting end of the optocoupler B7 is connected to the outdoor-unit main control circuit 210, and the light-receiving end of the optocoupler B7 is connected to the neutral wire N and the signal line SI. For example, an anode A of a light-emitting diode in the optocoupler B7 is connected to a reference voltage terminal (e.g., the reference voltage terminal supplying a 5 V voltage in FIG. 15) of the outdoor unit 200, and a cathode K of the light-emitting diode in the optocoupler B7 is connected to the outdoor-unit main control circuit 210. A collector electrode C of a phototriode in the optocoupler B7 is connected to the signal line SI through the resistor R18, and an emitter electrode E of the phototriode in the optocoupler B7 is connected to the emitter electrode E of the triode V2 and the neutral wire N.

The optocoupler B7 is configured to be turned on due to control of the outdoor-unit main control circuit 210 after the outdoor unit 200 is powered-on, so as to turn off the triode V2 and the triac optocoupler B6. For example, in a case where the outdoor-unit main control circuit 210 does not operate, the photocoupler B7 is turned off. In a case where the outdoor-unit main control circuit 210 is powered-on and operates normally, the photocoupler B7 is turned on.

An end of the resistor R19 is connected between the gate of the thyristor Q1 and the light-receiving end of the triac optocoupler B6, and another end of the resistor R19 is connected to the second electrode of the thyristor Q1 and the second input terminal of the third power supply 2201. The resistor R19 plays a role of voltage biasing, so as to control a voltage of the gate of the thyristor Q1, so that the thyristor Q1 may be turned on after the triac optocoupler B6 is turned on.

In some embodiments, as shown in FIGS. 14 and 15, the second loop H2 includes a switch-type relay K2 (i.e., a first switch-type relay). An end of a normally open contact of the switch-type relay K2 is connected to the second input terminal of the third power supply 2201, and another end thereof is connected to the live wire terminal L1 of the outdoor unit 200 through the sixth access terminal X6. An end of a coil of the switch-type relay K2 is connected to a reference voltage terminal (e.g., the reference voltage terminal supplying a 12 V voltage in FIG. 15) of the outdoor unit 200, and another end thereof is connected to the outdoor-unit main control circuit 210. The switch-type relay K2 is configured to be turned on according to the turn-on control signal sent by the outdoor-unit main control circuit 210, so as to turn on the second loop H2.

It will be noted that the first loop H1 and the second loop H2 are connected in parallel, and impedance of the second loop H2 is less than that of the first loop H1. In this way, in a case where the first loop H1 and the second loop H2 each are turned on, most of the current from the power supply line 300 passes through the second loop H2 and supplies power to the third power supply 2201. Moreover, after the second loop H2 is turned on, the first loop H1 is controlled to be turned off.

It will be noted that the 5 V voltage in the outdoor-unit communication circuit 240 and the 5 V and 12 V voltages in the power supply control circuit 230 in FIG. 15 may be supplied by the power supply 220.

The following describes a control process of the circuits between the indoor unit 100 and the outdoor unit 200.

In the standby state, the switch-type relay K3, the thyristor Q1, and the switch-type relay K2 are all turned off, so that the outdoor unit 200 cannot be powered-on to operate.

When the air conditioner 10 needs to be turned on for operation (that is, when the indoor unit 100 receives a startup command), the indoor-unit main control circuit 110 controls the switch-type relay K3 to be turned on, and a current charges the capacitor C5 after passing through the switch-type relay K3, the resistor R13, the diode D6, and the optocoupler B5. A voltage across the capacitor C5 is less than or equal to the voltage (e.g., a 24 V voltage) of the voltage stabilizing diode Z2 due to the limitation of the voltage stabilizing diode Z2. The optocoupler B5 outputs the zero crossing signal to the indoor-unit main control circuit 110. At this time, the photocoupler B3 is turned off, so that no signal is output from the signal line SI to the outdoor unit 200, and the outdoor-unit communication circuit 240 does not operate.

When the switch-type relay K3 is turned on for a first preset time (e.g., 1 s), the voltage across the capacitor C5 may be stabilized at 24 v. At this time, the indoor-unit main control circuit 110 controls the collector electrode C and the emitter electrode E of the optocoupler B3 to be turned on for a third preset time (e.g., about 2 ms) after delaying for a second preset time (e.g., 1 ms) after obtaining the zero crossing signal.

In this way, the current from the capacitor C5 passes through the optocoupler B3, the optocoupler B4, the diode D8, and the PTC resistor RT3 in sequence, and then is output to the PTC resistor RT2, the diode D10, the triac optocoupler B6, and the triode V2 through the signal line SI. In this case, the triode V2 is turned on, and the light-emitting end of the triac optocoupler B6 may trigger the light-receiving end of the triac optocoupler B6 to be turned on, so that the thyristor Q1 may be turned on. After the thyristor Q1 is turned on, the first loop H1 is turned on, so that the live wire L may supply power to the third power supply 2201 through the PTC resistor RT1 and the thyristor Q1. The third power supply 2201 may stably supply power to the outdoor-unit main control circuit 210 after being continuously supplied power for a period of time (e.g., 2 s).

The thyristor Q1 may continue to be turned on after receiving the trigger signal and may be turned off until the next zero crossing signal appears (that is, when a voltage or a current in a turn-on loop of the thyristor Q1 tends to zero). Therefore, within a half-wave cycle (e.g., the half-wave cycle being 10 ms in an example in which a frequency of the alternating current is 50 Hz) of the alternating current, it is necessary to control the optocoupler B3 to be turned on substantially a third preset time after the zero crossing signal appears, so that the first loop H1 may be turned on. The optocoupler B3 may be controlled to be turned off during the rest of the half-wave cycle, so that the capacitor C5 may be charged for a long time and the voltage of the capacitor C5 may be maintained at 24 v.

In a case where the second power supply 1202 corresponding to the indoor-unit communication circuit 130 has a weak current supply capability, the power supply control circuit 230 may be controlled according to such design, so that the communication circuits of the indoor unit 100 and the outdoor unit 200 may operate reliably in the driving of a lesser driving current.

The outdoor-unit main control circuit 210 may send the turn-on control signal after operating normally (e.g., after the first loop H1 is turned on for a fourth preset time), so as to control the switch-type relay K2 to be turned on, so that the power supply line 300 may supply power to the third power supply 2201 through the second loop H2. Here, since the second loop H2 is connected in parallel with the first loop H1, and impedance of the second loop H2 is less than that of the first loop H1, most of the current from the power supply line 300 passes through the second loop H2 and enters the third power supply 2201 after the switch-type relay K2 is turned on.

Meanwhile, the outdoor-unit main control circuit 210 controls the collector electrode C and the emitter electrode E of the optocoupler B7 to be turned on. A voltage between the base electrode B and the emitter electrode E of the triode V2 is lower than the turn-on voltage of the triode V2 after the optocoupler B7 is turned on. Therefore, the triode V2 is turned off and the triac optocoupler B6 is turned off, so that the current in the signal line SI no longer flows through a branch where the triac optocoupler B6 and the triode V2 are located. Therefore, the first loop H1 is turned off. In this way, when the air conditioner 10 is operating, the outdoor-unit main control circuit 210 is supplied power through the second loop H2.

At this time, the outdoor-unit main control circuit 210 controls the collector electrode C and the emitter electrode E of the optocoupler B1 to be turned on. In this way, the indoor-unit main control circuit 110 may send out a communication signal by controlling on/off of the optocoupler B3. For example, when the optocoupler B3 is turned on, the indoor-unit main control circuit 110 controls the indoor-unit communication circuit 130 to send out a communication signal with a high level; when the optocoupler B3 is turned off, the indoor-unit main control circuit 110 controls the indoor-unit communication circuit 130 to send out a communication signal with a low level. The outdoor-unit main control circuit 210 receives the communication signal through the optocoupler B2 and controls relevant load devices (e.g., a compressor and an outdoor fan motor) in the outdoor unit 200 to operate according to the communication signal.

Moreover, the indoor-unit main control circuit 110 controls the optocoupler B3 to be turned on after completing sending the communication signal, so as to wait for the outdoor-unit main control circuit 210 to reply to the communication signal. The outdoor-unit main control circuit 210 sends out a communication signal by controlling on/off of the optocoupler B1. The indoor-unit main control circuit 110 receives the communication signal through the optocoupler B4 and controls relevant load devices in the indoor unit 100 to operate according to the received communication signal. In addition, the indoor-unit main control circuit 110 may also prepare to send a new communication signal to the outdoor unit 200 next time during the above process.

In this way, the process of powering on the outdoor-unit main control circuit 210 and the communication process between the indoor unit 100 and the outdoor unit 200 are all completed after the startup command is received. It will be noted that in order to ensure reliable transmission of the communication signal, the communication sending terminal of the indoor unit 100 (or the outdoor unit 200) needs to be maintained in a turn-on state after sending the communication signal, so as to turn on the entire communication loop, so that the communication receiving terminal of the outdoor unit 200 (or the indoor unit 100) may reliably receive the communication signal. For example, in a case where the optocoupler B3 of the indoor unit 100 sends a communication signal, the optocoupler B1 of the outdoor unit 200 is in the turn-on state; in a case where the optocoupler B1 of the outdoor unit 200 sends a communication signal, the optocoupler B3 of the indoor unit 100 is in the turn-on state.

In a case where the indoor-unit main control circuit 110 receives a shutdown command, the indoor-unit main control circuit 110 sends a shutdown signal by controlling the optocoupler B3. After receiving the shutdown signal through the optocoupler B2, the outdoor-unit main control circuit 210 stops operation of the relevant load devices in the outdoor unit 200, and replies the information of receiving the shutdown signal to the indoor-unit main control circuit 110 through the optocoupler B1. The indoor-unit main control circuit 110 controls the optocoupler B3 to be turned off after receiving the reply. At this time, there is no current signal output from the signal line SI to the outdoor-unit main control circuit 210.

In this case, after delaying for the fifth preset time, if determining that no new signal is sent by the indoor-unit main control circuit 110, the outdoor-unit main control circuit 210 controls the switch-type relay K2 to be turned off, so as to cut off the power supply to the outdoor-unit main control circuit 210.

In addition, after sending the shutdown signal, if determining that the outdoor-unit communication circuit 240 receives the shutdown signal, the indoor-unit main control circuit 110 controls the switch-type relay K3 to be turned off, so as to further reduce standby power consumption. So far, the outdoor-unit main control circuit 210 completes the shutdown process and enters a powered-off state, and waits for a next startup operation.

A corresponding timing of the above control process is described below in combination with FIG. 18.

Figure 18:
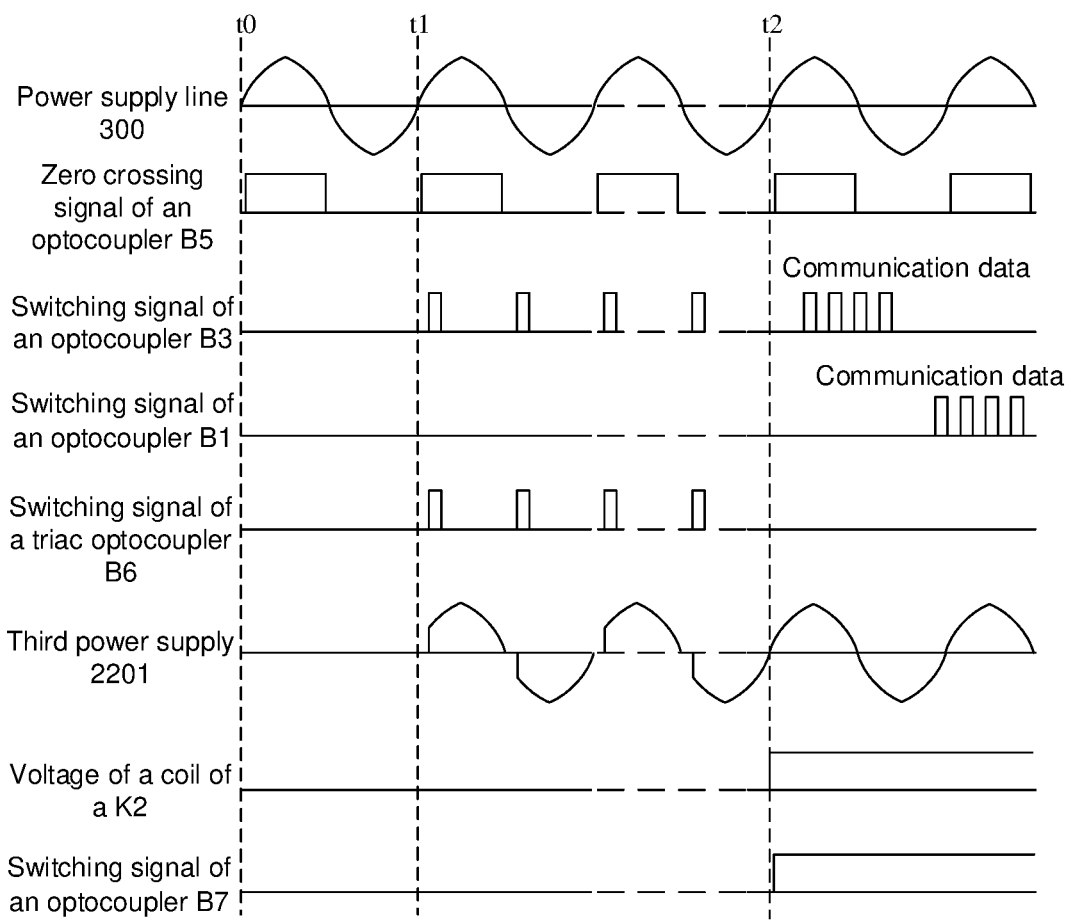
FIG. 18 is a schematic diagram showing yet another operation timing logic in a startup process of an air conditioner, in accordance with some embodiments.

As shown in FIG. 18, the power supply line 300 always has a commercial power with an alternating current. A period from moment t0 to moment t1 is a period when the optocoupler B3 is turned off. During such period, a switching signal of the optocoupler B3 is at a low level, and the indoor-unit communication circuit 130 does not transmit the power supply control signal to the power supply control circuit 230 through the signal line SI. Moreover, during the period from moment t0 to moment t1, the switch-type relay K2 is not energized, a voltage of the coil of the switch-type relay K2 is at a low level, a switching signal of the triac optocoupler B6 is at a low level, and the triac optocoupler B6 is turned off. Therefore, during such period, the first loop H1 and the second loop H2 that the power supply line 300 supplies power to the third power supply 2201 are turned off, and the third power supply 2201 is powered-off, so that a voltage of the third power supply 2201 is zero.

During a period from moment t1 to moment t2, the switching signal of the optocoupler B3 is briefly at a high level many times, and the optocoupler B3 is briefly turned on many times. Therefore, during such period, the indoor-unit communication circuit 130 transmits the power supply control signal to the power supply control circuit 230 of the outdoor unit 200 through the signal line SI, the switching signal of the triac optocoupler B6 is also briefly at a high level many times, and the triac optocoupler B6 is turned on. As a result, the first loop H1 that the power supply line 300 supplies power to the third power supply 2201 is turned on, the third power supply 2201 starts being powered-on and supplies power to the outdoor-unit main control circuit 210.

At moment t2, the outdoor-unit main control circuit 210 sends the turn-on control signal to the switch-type relay K2, the switch-type relay K2 is energized, and the voltage of the coil of the switch-type relay K2 changes from the low level to a high level, so that the second loop H2 that the power supply line 300 supplies power to the power supply 220 may be turned on. Moreover, the outdoor-unit main control circuit 210 sends a control signal to the optocoupler B7, so that a switching signal of the optocoupler B7 is at a high level. In this case, the optocoupler B7 is turned on, the triode V2 is turned off, and the triac optocoupler B6 is turned off, so that the current in the signal line SI no longer flows through the branch where the triac optocoupler B6 and the triode V2 are located, and the signal line SI may transmit other communication data.

It will be noted that the above switching signal refers to a signal used to trigger the optocoupler or the triac optocoupler to be turned on.

Figure 19:
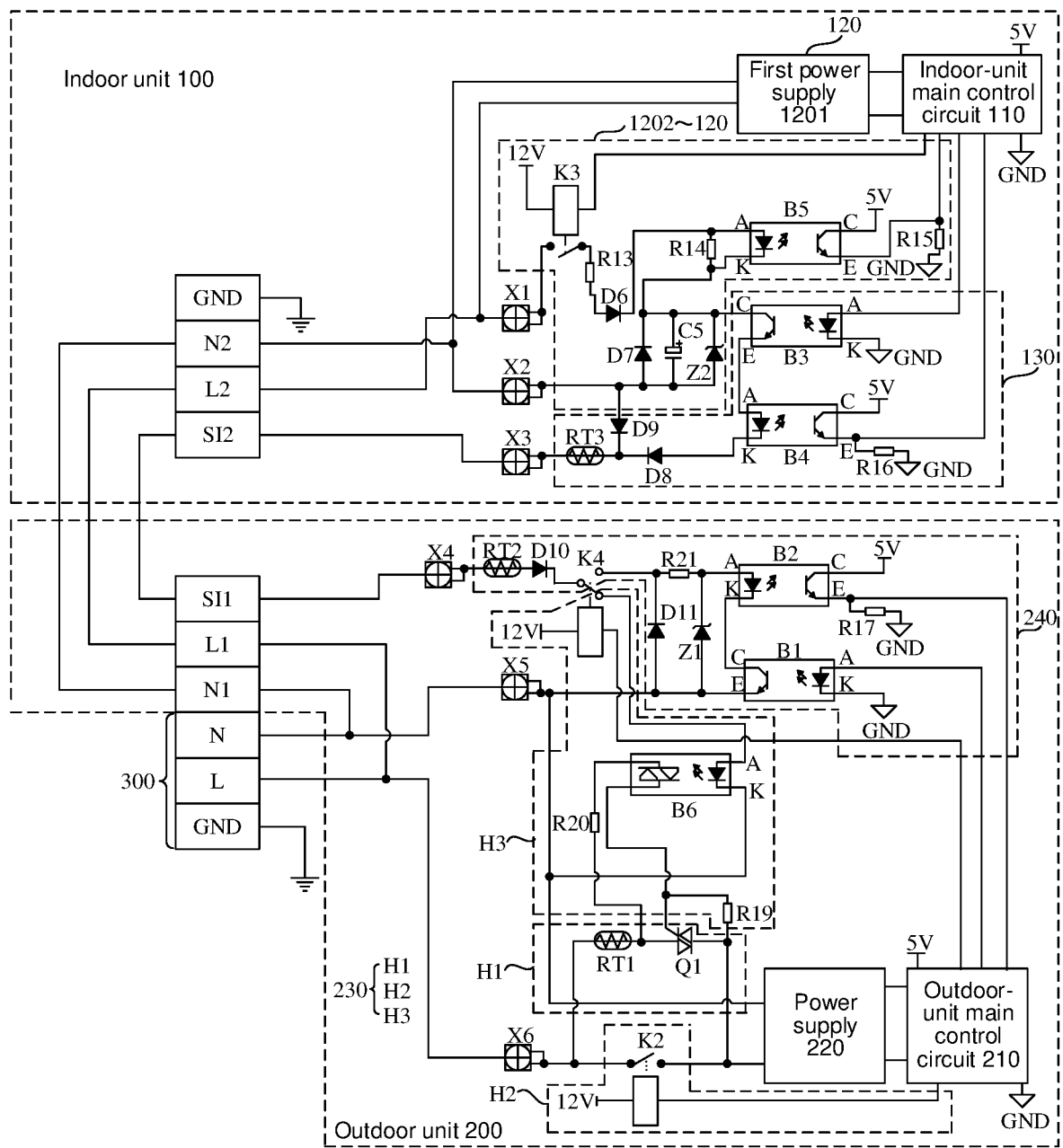
FIG. 19 is a diagram showing yet another structure of an air conditioner, in accordance with some embodiments.
Figure 20:
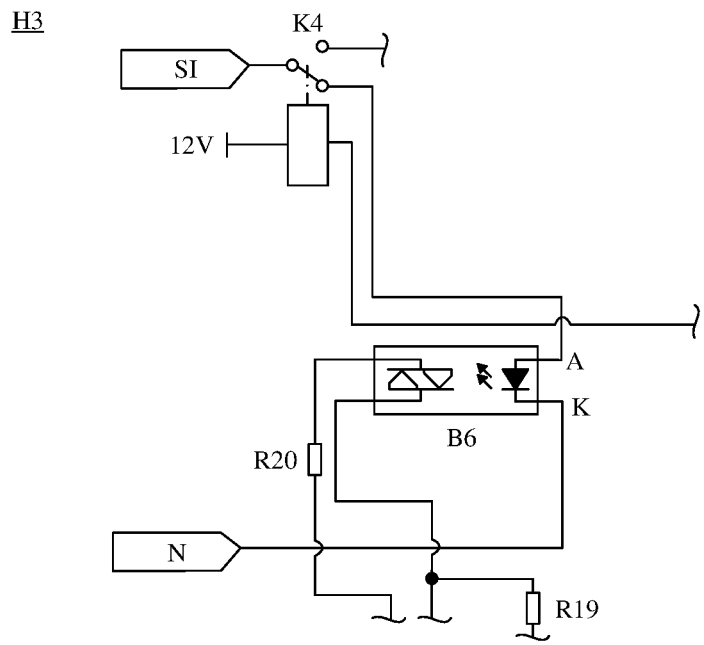
FIG. 20 is a diagram showing another structure of a trigger circuit, in accordance with some embodiments.

In some other embodiments, the trigger circuit H3 may have other structures. In the trigger circuit H3, a normally closed changeover-type relay K4 may also be used to replace the resistor R18, the triode V2, and the optocoupler B7. As shown in FIGS. 19 and 20, in addition to the triac optocoupler B6, the resistor R19, and the resistor R20, the trigger circuit H3 further includes a normally closed changeover-type relay K4.

The normally closed changeover-type relay K4 is configured to switch a movable contact from being connected with a normally closed contact to being connected with a normally open contact due to control of the outdoor-unit main control circuit 210 after the outdoor unit 200 is powered-on, so as to connect the signal line SI with the outdoor-unit communication circuit 240 and disconnect the signal line SI with the trigger circuit H3, so that communication between the indoor unit 100 and the outdoor unit 200 may be performed.

An end of a coil of the normally closed changeover-type relay K4 is connected to a reference voltage terminal (e.g., the reference voltage terminal supplying a 12 V voltage in FIG. 19) of the outdoor unit 200, and another end of the coil of the normally closed changeover-type relay K4 is connected to the outdoor-unit main control circuit 210, so that the power supply of the normally closed changeover-type relay K4 may be controlled by the outdoor-unit main control circuit 210. The movable contact of the normally closed changeover-type relay K4 is connected to the signal line SI, the normally closed contact of the normally closed changeover-type relay K4 is connected to the light-emitting end of the triac optocoupler B6, and the normally open contact of the normally closed changeover-type relay K4 is connected to the outdoor-unit communication circuit 240.

For example, the movable contact of the normally closed changeover-type relay K4 is connected to the cathode of the diode D10. The normally closed contact of the normally closed changeover-type relay K4 is connected to the anode A of the light-emitting diode in the triac optocoupler B6. The normally open contact of the normally closed changeover-type relay K4 is connected to the cathode of the diode D11 and the one end of the resistor R21.

It will be noted that for the functions of the triac optocoupler B6, the resistor R19, and the resistor R20 and the connection structures between each other, reference may be made to the relevant content described above, and details will not be repeated herein.

The following describes a control process of the circuits between the indoor unit 100 and the outdoor unit 200.

In the standby state, the movable contact of the normally closed changeover-type relay K4 is connected to the normally closed contact thereof, and the switch-type relay K3, the thyristor Q1, and the switch-type relay K2 are all turned off, so that the outdoor unit 200 cannot be powered-on to operate.

When the air conditioner 10 needs to be turned on, the indoor-unit main control circuit 110 controls the switch-type relay K3 to be turned on, and a current charges the capacitor C5 after passing through the switch-type relay K3, the resistor R13, the diode D6, and the optocoupler B5. A voltage across the capacitor C5 is less than or equal to the voltage (e.g., a 24 V voltage) of the voltage stabilizing diode Z2 due to the limitation of the voltage stabilizing diode Z2. The optocoupler B5 outputs the zero crossing signal to the indoor-unit main control circuit 110. At this time, the photocoupler B3 is turned off, so that no signal is output from the signal line SI to the outdoor unit 200, and the outdoor-unit communication circuit 240 does not operate.

When the switch-type relay K3 is turned on for the first preset time, the voltage across the capacitor C5 may be stabilized at 24 v. At this time, the indoor-unit main control circuit 110 controls the collector electrode C and the emitter electrode E of the optocoupler B3 to be turned on for the third preset time after delaying for the second preset time after obtaining the zero crossing signal.

In this way, the current from the capacitor C5 passes through the optocoupler B3, the optocoupler B4, the diode D8, and the PTC resistor RT3 in sequence, and then is output to the PTC resistor RT2, the diode D10, the normally closed changeover-type relay K4, and the triac optocoupler B6 through the signal line SI. In this case, the light-emitting end of the triac optocoupler B6 may trigger the light-receiving end of the triac optocoupler B6 to be turned on, so that the thyristor Q1 may be turned on. After the thyristor Q1 is turned on, the first loop H1 is turned on, so that the live wire L may supply power to the third power supply 2201 through the PTC resistor RT1 and the thyristor Q1. The third power supply 2201 may stably supply power to the outdoor-unit main control circuit 210 after being continuously supplied power for the period of time.

The outdoor-unit main control circuit 210 may send the turn-on control signal after operating normally, so as to control the switch-type relay K2 to be turned on, so that the power supply line 300 may supply power to the third power supply 2201 through the second loop H2. Most of the current from the power supply line 300 passes through the second loop H2 and enters the third power supply 2201.

Meanwhile, the outdoor-unit main control circuit 210 controls the movable contact of the normally closed changeover-type relay K4 to be connected to the normally open contact of the normally closed changeover-type relay K4, so that the current signal in the signal line SI no longer flows through the triac optocoupler B6, and the triac optocoupler B6 is turned off. Therefore, the first loop H1 is turned off. In this way, when the air conditioner 10 is operating, the outdoor-unit main control circuit 210 is supplied power through the second loop H2.

At this time, the outdoor-unit main control circuit 210 controls the collector electrode C and the emitter electrode E of the optocoupler B1 to be turned on. In this way, the indoor-unit main control circuit 110 may send out a communication signal by controlling on/off of the optocoupler B3. The outdoor-unit main control circuit 210 receives the communication signal through the optocoupler B2 and controls the relevant load devices in the outdoor unit 200 to operate according to the communication signal.

Moreover, the indoor-unit main control circuit 110 controls the optocoupler B3 to be turned on after completing sending the communication signal, so as to wait for the outdoor-unit main control circuit 210 to reply to the communication signal. The outdoor-unit main control circuit 210 sends out a communication signal by controlling on/off of the optocoupler B1. The indoor-unit main control circuit 110 receives the communication signal through the optocoupler B4 and controls the relevant load devices in the indoor unit 100 to operate according to the communication signal. In addition, the indoor-unit main control circuit 110 may also prepare to send a new communication signal to the outdoor unit 200 next time during the above process.

In this way, the process of powering on the outdoor-unit main control circuit 210 and the communication process between the indoor unit 100 and the outdoor unit 200 are all completed after the startup command is received.

In a case where the indoor-unit main control circuit 110 receives the shutdown command, the indoor-unit main control circuit 110 sends the shutdown signal by controlling the optocoupler B3. After receiving the shutdown signal through the optocoupler B2, the outdoor-unit main control circuit 210 stops operation of the relevant load devices in the outdoor unit 200, and replies the information of receiving the shutdown signal to the indoor-unit main control circuit 110 through the optocoupler B1. The indoor-unit main control circuit 110 controls the optocoupler B3 to be turned off after receiving the reply. At this time, there is no current signal output from the signal line SI to the outdoor-unit main control circuit 210.

In this case, after delaying for the fifth preset time, if determining that no new signal is sent by the indoor-unit main control circuit 110, the outdoor-unit main control circuit 210 controls the switch-type relay K2 to be turned off, so as to cut off the power supply to the outdoor-unit main control circuit 210. Meanwhile, the outdoor-unit main control circuit 210 controls the normally closed changeover-type relay K4 to be powered-off, so that the movable contact of the normally closed changeover-type relay K4 may be connected to the normally closed contact thereof.

In addition, after sending the shutdown signal, if determining that the outdoor-unit communication circuit 240 receives the shutdown signal, the indoor-unit main control circuit 110 controls the switch-type relay K3 to be turned off, so as to further reduce standby power consumption. So far, the outdoor-unit main control circuit 210 completes the shutdown process and enters the powered-off state, and waits for a next startup operation.

A corresponding timing of the above control process is described below in combination with FIG. 21.

Figure 21:
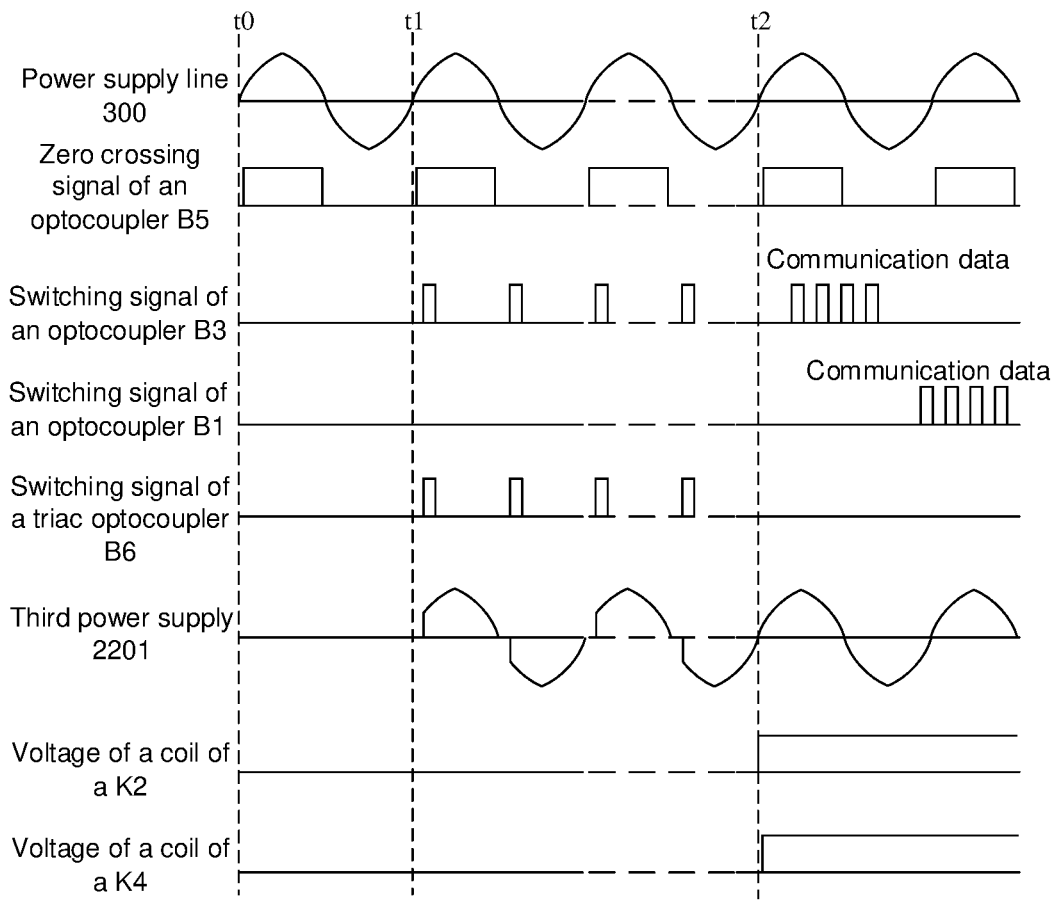
FIG. 21 is a schematic diagram showing yet another operation timing logic in a startup process of an air conditioner, in accordance with some embodiments.

As shown in FIG. 21, the power supply line 300 always has a commercial power with the alternating current. A period from moment t0 to moment t1 is a period when the optocoupler B3 is turned off. During such period, a switching signal of the optocoupler B3 is at a low level, and the indoor-unit communication circuit 130 does not transmit the power supply control signal to the power supply control circuit 230 through the signal line SI. Moreover, during the period from moment t0 to moment t1, the switch-type relay K2 and the normally closed changeover-type relay K4 are not energized, a voltage of the coil of the switch-type relay K2 is at a low level. Moreover, the movable contact of the normally closed changeover-type relay K4 is connected to the normally closed contact thereof, a switching signal of the triac optocoupler B6 is at a low level, and the triac optocoupler B6 is turned off. Therefore, during such period, the first loop H1 and the second loop H2 that the power supply line 300 supplies power to the third power supply 2201 are turned off, and the third power supply 2201 is powered-off, so that a voltage of the third power supply 2201 is zero.

During a period from moment t1 to moment t2, the switching signal of the optocoupler B3 is briefly at a high level many times, and the optocoupler B3 is briefly turned on many times. Therefore, during such period, the indoor-unit communication circuit 130 transmits the power supply control signal to the power supply control circuit 230 of the outdoor unit 200 through the signal line SI, the switching signal of the triac optocoupler B6 is also briefly at a high level many times, and the triac optocoupler B6 is turned on. As a result, the first loop H1 that the power supply line 300 supplies power to the third power supply 2201 is turned on, the third power supply 2201 starts being powered-on and supplies power to the outdoor-unit main control circuit 210.

At moment t2, the outdoor-unit main control circuit 210 sends the turn-on control signal to the switch-type relay K2, the switch-type relay K2 is energized, and the voltage of the coil of the switch-type relay K2 changes from the low level to a high level, so that the second loop H2 that the power supply line 300 supplies power to the power supply 220 may be turned on. Moreover, the outdoor-unit main control circuit 210 controls the normally closed changeover-type relay K4 to be powered-on, and a voltage of the coil of the normally closed changeover-type relay K4 is at a high level, so that the movable contact of the normally closed changeover-type relay K4 is connected to the normally open contact thereof. In this case, the current in the signal line SI no longer flows through the triac optocoupler B6, and the triac optocoupler B6 is turned off, so that the signal line SI may transmit other communication data.

Of course, in some other embodiments, the power supply control circuit 230 may also be achieved by a field effect transistor.

Figure 22:
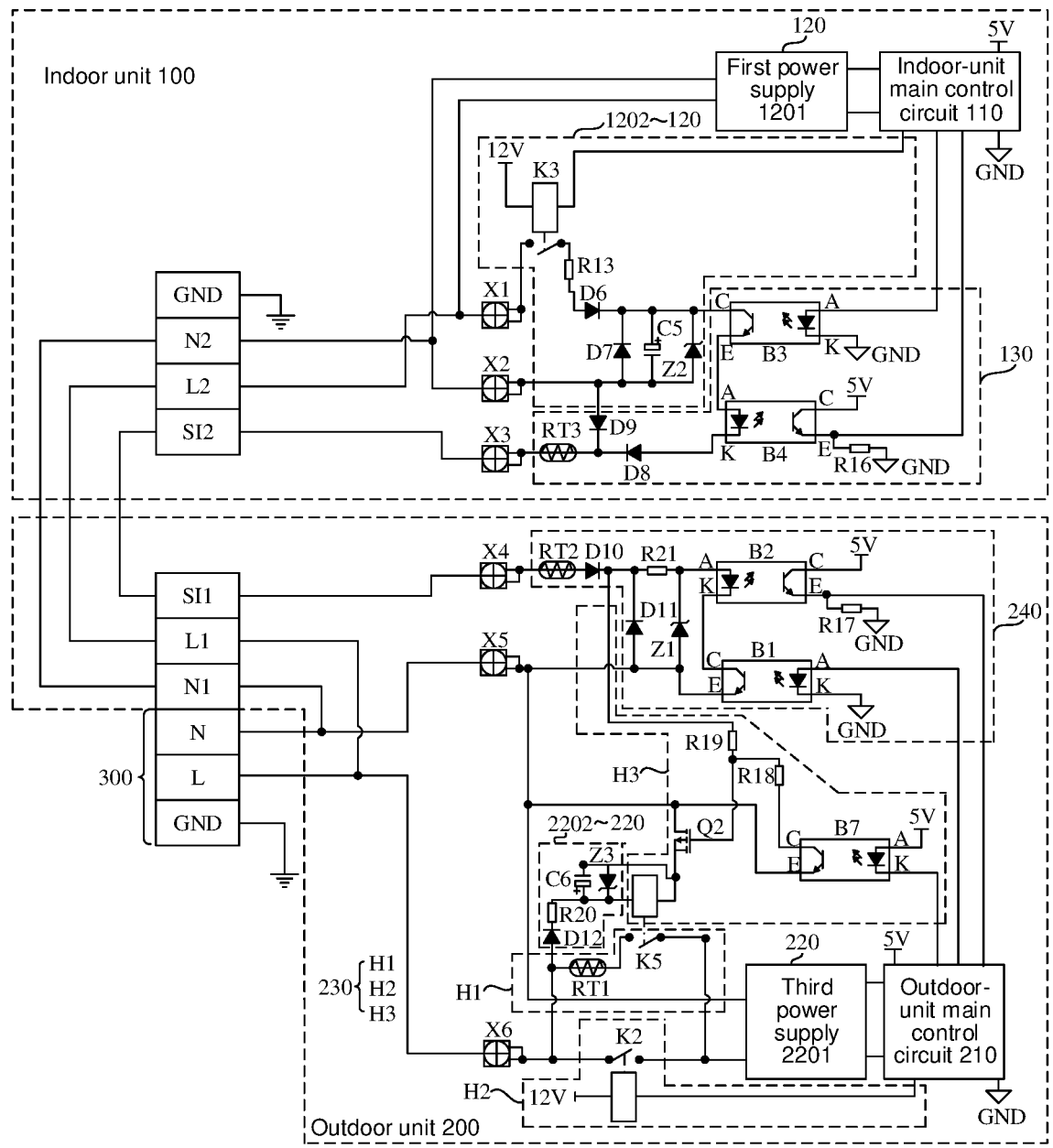
FIG. 22 is a diagram showing yet another structure of an air conditioner, in accordance with some embodiments.

In this case, as shown in FIG. 22, the second power supply 1202 omits the resistor R14, the resistor R15, and the optocoupler B5. Here, the circuit structure of the second power supply 1202 is similar to the relevant content described above, and details will not be repeated herein. Moreover, the outdoor unit 200 includes a plurality of power supplies 220. In some examples, the plurality of power supplies 220 include a third power supply 2201 and a fourth power supply 2202.

For the third power supply 2201, reference may be made to the relevant content described above, and details will not be repeated herein. An input terminal of the fourth power supply 2202 is connected to the live wire L and the neutral wire N of the power supply line 300, and an output terminal of the fourth power supply 2202 is connected to an end of a coil of a switch-type relay K5 (i.e., a third switch-type relay). The fourth power supply 2202 is configured to supply power to the switch-type relay K5, which is conducive to on/off of the switch-type relay K5.

Figure 23:
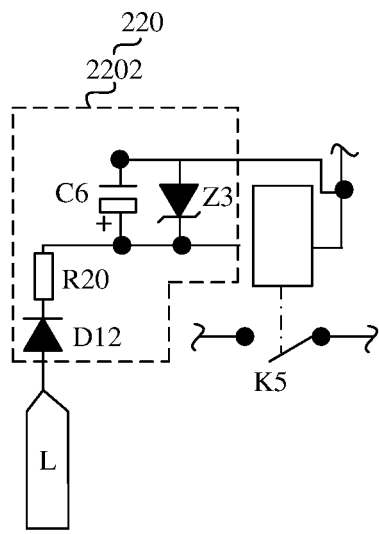
FIG. 23 is a diagram showing a structure of a fourth power supply, in accordance with some embodiments.

For example, as shown in FIGS. 22 and 23, the fourth power supply 2202 includes a diode D12, a resistor R20, a capacitor C6, and a voltage stabilizing diode Z3. An anode of the diode D12 is connected to the live wire terminal L1 of the outdoor unit 200 through the sixth access terminal X6, and a cathode of the diode D12 is connected to an end of the resistor R20. Another end of the resistor R20 is connected to the one end of the coil of the switch-type relay K5. An end of the capacitor C6 is connected between the another end of the resistor R20 and the one end of the coil of the switch-type relay K5, and another end of the capacitor C6 is connected to another end of the coil of the switch-type relay K5. The voltage stabilizing diode Z3 is connected in parallel with the capacitor C6, and a cathode of the voltage stabilizing diode Z3 is connected between the one end of the capacitor C6 and the one end of the coil of the switch-type relay K5. Here, the above devices may form a half-wave rectifier circuit.

In some embodiments, as shown in FIG. 22, the first loop H1 includes a PTC resistor RT1 and the switch-type relay K5. An end of the PTC resistor RT1 is connected to the live wire L through the sixth access terminal X6, and another end of the PTC resistor RT1 is connected to an end of the switch-type relay K5. For the function of the PTC resistor RT1, reference may be made to the relevant content described above, and details will not be repeated herein.

Another end of the switch-type relay K5 is connected to the second input terminal of the third power supply 2201. The one end of the coil of the switch-type relay K5 is connected to the output terminal of the fourth power supply 2202, and the another end of the coil of the switch-type relay K5 is connected to the output terminal of the trigger circuit H3. The switch-type relay K5 is configured to be turned on due to control of the trigger signal of the trigger circuit H3, so that the first loop H1 may be turned on and the power supply line 300 may supply power to the third power supply 2201.

Figure 24:
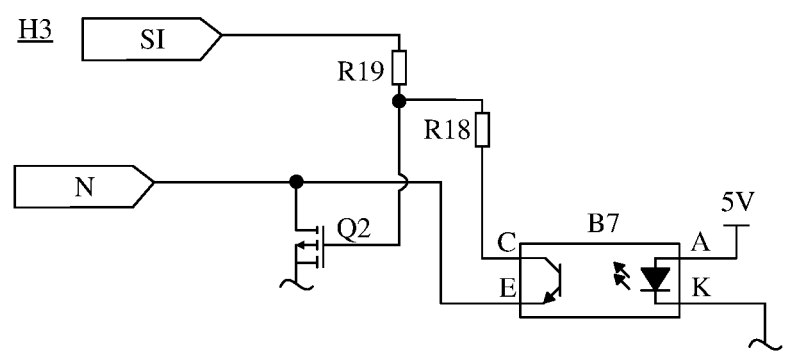
FIG. 24 is a diagram showing yet another structure of a trigger circuit, in accordance with some embodiments.

In some embodiments, as shown in FIGS. 22 and 24, the trigger circuit H3 includes a resistor R18, a resistor R19, an optocoupler B7, and a metal-oxide-semiconductor field effect transistor (MOSFET, MOS for short) Q2.

A gate of the MOS Q2 is connected to the signal line SI, a first electrode of the MOS Q2 is connected to the neutral wire N of the power supply line 300, and a second electrode of the MOS Q2 is connected to the another end of the coil of the switch-type relay K5. For example, the gate of the MOS Q2 is connected to the cathode of diode D10 through the resistor R19. The first electrode of the MOS Q2 is connected to the neutral wire terminal N1 of the outdoor unit 200 through the fifth access terminal X5, and the second electrode of the MOS Q2 is connected to the another end of the coil of the switch-type relay K5.

The MOS Q2 is configured to be turned on when receiving the power supply control signal sent by the indoor unit 100 through the signal line SI, so as to control the switch-type relay K5 to be turned on. In this way, the switch-type relay K5 may be turned on due to control of the MOS Q2, so that the power supply line 300 may supply power to the third power supply 2201.

The power supply control signal is at a high level for a period of time. It will be noted that since impedance of the power supply control circuit 230 is relatively high, the current value of the power supply control signal may be less than or equal to the first preset value. Moreover, the MOS Q2 is a voltage-controlled device, and a low current is required to drive the MOS Q2 to be turned on.

Here, the resistor R19 (i.e., the third resistor) is configured to limit the current supplied to the gate of the MOS Q2.

The light-emitting end of the optocoupler B7 is connected to the outdoor-unit main control circuit 210, and the light-receiving end of the optocoupler B7 is connected to the neutral wire terminal N1 of the outdoor unit 200 and the signal line SI. The optocoupler B7 is configured to be turned on due to control of the outdoor-unit main control circuit 210 after the outdoor unit 200 is powered-on, so as to turn off the MOS Q2, thereby controlling the switch-type relay K5 to be turned off.

For example, the collector electrode C of the phototriode in the optocoupler B7 is connected to the signal line SI through the resistor R18 and the resistor R19, and the emitter electrode E of the phototriode in the optocoupler B7 is connected to the neutral wire terminal N1 of the outdoor unit 200. The anode A of the light-emitting diode in the optocoupler B7 is connected to a reference voltage terminal (e.g., the reference voltage terminal supplying a 5 V voltage in FIG. 22) of the outdoor unit 200, and the cathode K of the light-emitting diode in the optocoupler B7 is connected to the outdoor-unit main control circuit 210.

Here, the resistor R18 is configured to limit the current passing through the optocoupler B7. The functions of the resistor R18 and the optocoupler B7 are similar to the relevant content described above, and details will not be repeated herein.

The following describes a control process of the circuits between the indoor unit 100 and the outdoor unit 200.

In the standby state, the switch-type relay K3, the switch-type relay K2, and the switch-type relay K5 are all turned off, so that the outdoor unit 200 cannot be powered-on to operate.

When the indoor unit 100 receives the startup command, the indoor-unit main control circuit 110 controls the switch-type relay K3 to be turned on, and the current charges the capacitor C5 after passing through the switch-type relay K3, the resistor R13, and the diode D6. A voltage across the capacitor C5 is less than or equal to the voltage (e.g., a 24 V voltage) of the voltage stabilizing diode Z2 due to the limitation of the voltage stabilizing diode Z2. At this time, the photocoupler B3 is turned off, so that no signal is output from the signal line SI to the outdoor unit 200, and the outdoor-unit communication circuit 240 does not operate.

When the switch-type relay K3 is turned on for the first preset time, the voltage across the capacitor C5 may be stabilized at 24 v. At this time, the indoor-unit main control circuit 110 controls the collector electrode C and the emitter electrode E of the optocoupler B3 to be turned on. In this way, the current from the capacitor C5 passes through the optocoupler B3, the optocoupler B4, the diode D8, and the PTC resistor RT3 in sequence, and then is output to the PTC resistor RT2, the diode D10, the resistor R19, and the MOS Q2 through the signal line SI.

In this case, the MOS Q2 is turned on. After the MOS Q2 is turned on, the fourth power supply 2202 is triggered to supply a stable power supply (e.g., a power supply with a 12 V voltage) to the switch-type relay K5. The switch-type relay K5 is turned on, and the first loop H1 is turned on, so that the live wire L may pass through the PTC resistor RT1 and the switch-type relay K5 and supply power to the third power supply 2201. The third power supply 2201 may stably supply power to the outdoor-unit main control circuit 210 after being continuously supplied power for the period of time.

The outdoor-unit main control circuit 210 may send the turn-on control signal after operating normally, so as to control the switch-type relay K2 to be turned on, so that the power supply line 300 may supply power to the third power supply 2201 through the second loop H2. Most of the current from the power supply line 300 enters the third power supply 2201 through the second loop H2 after the switch-type relay K2 is turned on.

Meanwhile, the outdoor-unit main control circuit 210 controls the collector electrode C and the emitter electrode E of the optocoupler B7 to be turned on. After the optocoupler B7 is turned on, a voltage between the gate and the source electrode of the MOS Q2 is less than a turn-on voltage of the MOS Q2, so that the MOS Q2 is turned off and the switch-type relay K5 is turned off. Therefore, the current in the signal line SI no longer flows the branch where the MOS Q2 is located. Therefore, the first loop H1 is turned off. In this way, when the air conditioner 10 is operating, the outdoor-unit main control circuit 210 is supplied power through the second loop H2.

At this time, the outdoor-unit main control circuit 210 controls the collector electrode C and the emitter electrode E of the optocoupler B1 to be turned on. In this way, the indoor-unit main control circuit 110 may send out a communication signal by controlling on/off of the optocoupler B3. The outdoor-unit main control circuit 210 receives the communication signal through the optocoupler B2 and controls the relevant load devices in the outdoor unit 200 to operate according to the communication signal.

Moreover, the indoor-unit main control circuit 110 controls the optocoupler B3 to be turned on after completing sending the communication signal, so as to wait for the outdoor-unit main control circuit 210 to reply to the communication signal. The outdoor-unit main control circuit 210 sends out a communication signal by controlling on/off of the optocoupler B1. The indoor-unit main control circuit 110 receives the communication signal through the optocoupler B4 and controls the relevant load devices in the indoor unit 100 to operate according to the communication signal. In addition, the indoor-unit main control circuit 110 may also prepare to send a new communication signal to the outdoor unit 200 next time during the above process.

In this way, the process of powering on the outdoor-unit main control circuit 210 and the communication process between the indoor unit 100 and the outdoor unit 200 are all completed after the startup command is received.

In a case where the indoor-unit main control circuit 110 receives the shutdown command, the indoor-unit main control circuit 110 sends the shutdown signal by controlling the optocoupler B3. After receiving the shutdown signal through the optocoupler B2, the outdoor-unit main control circuit 210 stops operation of the relevant load devices in the outdoor unit 200, and replies the information of receiving the shutdown signal to the indoor-unit main control circuit 110 through the optocoupler B1. The indoor-unit main control circuit 110 controls the optocoupler B3 to be turned off after receiving the reply. At this time, there is no current signal output from the signal line SI to the outdoor-unit main control circuit 210.

In this case, after delaying for the fifth preset time, if determining that no new signal is sent by the indoor-unit main control circuit 110, the outdoor-unit main control circuit 210 controls the switch-type relay K2 to be turned off, so as to cut off the power supply to the outdoor-unit main control circuit 210.

In addition, after the indoor-unit main control circuit 110 sends the shutdown signal, if determining that the outdoor-unit communication circuit 240 receives the shutdown signal, the indoor-unit main control circuit 110 controls the switch-type relay K3 to be turned off, so as to further reduce standby power consumption. So far, the outdoor-unit main control circuit 210 completes the shutdown process and enters the powered-off state, and waits for a next startup operation.

A corresponding timing of the above control process is described below in combination with FIG. 25.

Figure 25:
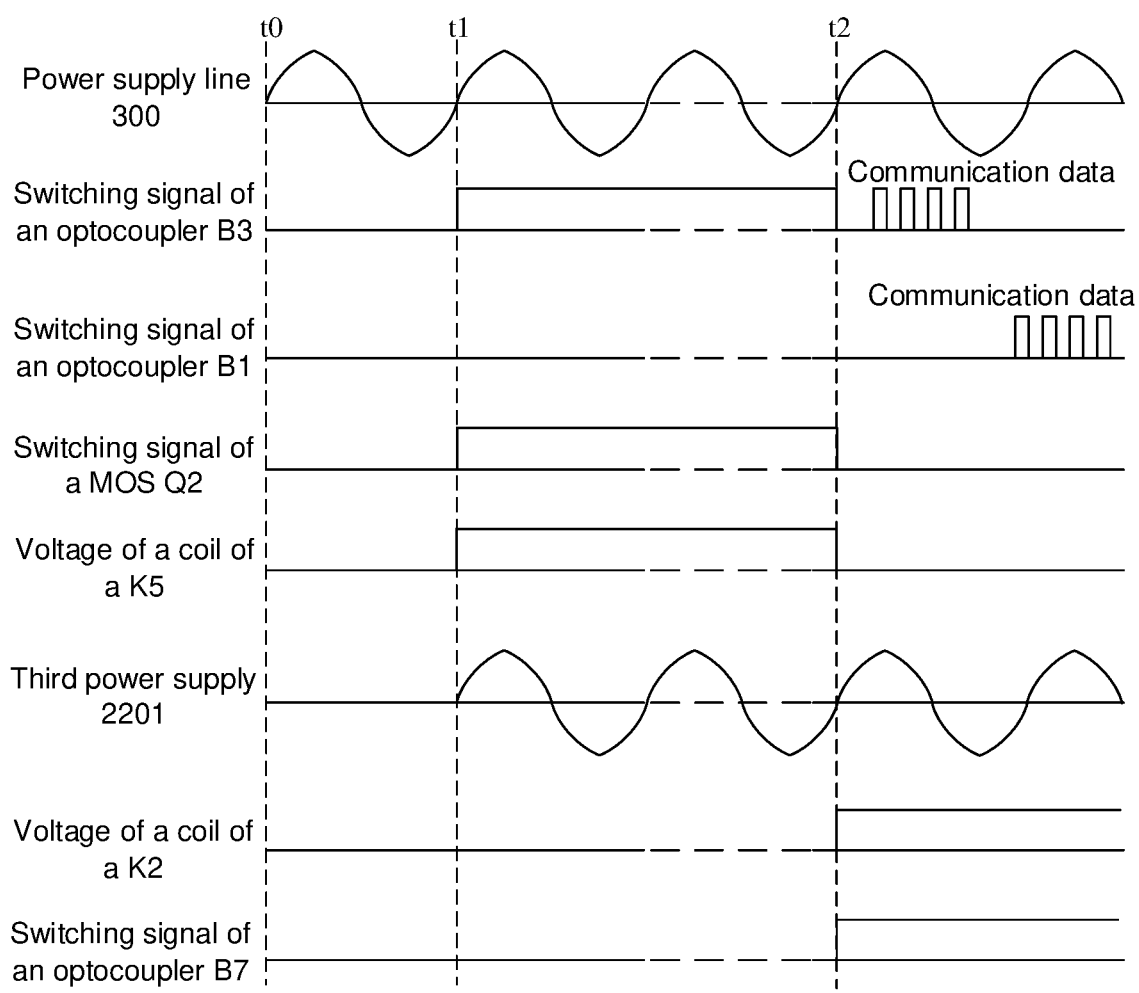
FIG. 25 is a schematic diagram showing yet another operation timing logic in a startup process of an air conditioner, in accordance with some embodiments.

As shown in FIG. 25, the power supply line 300 always has a commercial power with the alternating current. A period from moment t0 to moment t1 is a period when the optocoupler B3 is turned off. During such period, a switching signal of the optocoupler B3 is at a low level, and the indoor-unit communication circuit 130 does not transmit the power supply control signal to the power supply control circuit 230 through the signal line SI. Moreover, during the period from moment t0 to moment t1, switching signals of the switch-type relay K2 and the MOS Q2 are at low levels, the coil of the switch-type relay K2 is not energized, the MOS Q2 is turned off, so that the coil of the switch-type relay K5 is not energized. Therefore, during such period, the first loop H1 and the second loop H2 that the power supply line 300 supplies power to the third power supply 2201 are turned off, and the third power supply 2201 is powered-off, so that a voltage of the third power supply 2201 is zero.

During a period from moment t1 to moment t2, the switching signal of the optocoupler B3 is at a high level, and the optocoupler B3 is turned on. Therefore, during such period, the indoor-unit communication circuit 130 transmits the power supply control signal to the power supply control circuit 230 of the outdoor unit 200 through the signal line SI. Therefore, the switching signal of the MOS Q2 is at a high level, the switching signal of the switch-type relay K5 is at a high level, and the coil of the switch-type relay K5 is energized. As a result, the first loop H1 that the power supply line 300 supplies power to the third power supply 2201 is turned on, the third power supply 2201 starts being powered-on and supplies power to the outdoor-unit main control circuit 210.

At moment t2, the outdoor-unit main control circuit 210 sends the turn-on control signal to the switch-type relay K2. The switching signal of the switch-type relay K2 is at a high level, and the coil of the switch-type relay K2 is energized, so that the second loop H2 that the power supply line 300 supplies power to the power supply 220 is turned on. Moreover, the outdoor-unit main control circuit 210 sends a control signal to the optocoupler B7, so that a switching signal of the optocoupler B7 is at a high level. In this case, the optocoupler B7 is turned on, and the MOS Q2 is turned off. In this case, the current in the signal line SI no longer flows through the MOS Q2, so that the signal line SI may transmit other communication data.

In some embodiments of the present disclosure, in a case where the power supply 120 supplying power to the indoor-unit communication circuit 130 has a weak current supply capability, the power supplied by the power supply 220 in the outdoor unit 200 may be controlled by a lesser driving current of the signal line SI, so as to further reduce a requirement on diameters of cables between the indoor unit 100 and the outdoor unit 200.

In the above description of the embodiments, specific features, structures, materials, or characteristics may be combined in a suitable manner in any one or more embodiments or examples.

A person skilled in the art will understand that the scope of disclosure in the present disclosure is not limited to specific embodiments discussed above and may modify and substitute some elements of the embodiments without departing from the spirits of the present disclosure. The scope of the present disclosure is limited by the appended claims.

What is claimed is:

1. An air conditioner, comprising:
an indoor unit including:
an indoor-unit main control circuit configured to control operation of at least one indoor power supply and an indoor-unit communication circuit and control communication between an outdoor unit and the indoor unit;
the indoor-unit communication circuit connected to a power supply control circuit and an outdoor-unit communication circuit of the outdoor unit through a signal line and configured to communicate with the outdoor unit; and
the at least one indoor power supply configured to supply power to the indoor-unit main control circuit and the indoor-unit communication circuit; and
the outdoor-unit, a live wire terminal of the outdoor unit being connected to a live wire terminal of the indoor unit, and the live wire terminal of the outdoor unit being connected to a live wire of a power supply line;
a neutral wire terminal of the outdoor unit being connected to a neutral wire terminal of the indoor unit, and the neutral wire terminal of the outdoor unit being connected to a neutral wire of the power supply line;
the outdoor unit including:
an outdoor-unit main control circuit configured to control operation of at least one outdoor power supply, the power supply control circuit, and the outdoor-unit communication circuit, and control communication between the outdoor unit and the indoor unit;
the outdoor-unit communication circuit configured to communicate with the indoor unit;
the power supply control circuit disposed in a loop in which the power supply line supplies power to at least one outdoor power supply and configured to control the power supply line to supply power to the at least one outdoor power supply by controlling on/off of the loop; and
the at least one outdoor power supply configured to supply power to the outdoor-unit main control circuit and the outdoor-unit communication circuit after receiving power supplied by the power supply line;
wherein the power supply control circuit includes:
a first loop being a loop turned on due to control of a power supply control signal for supplying power to the at least one outdoor power supply by the power supply line; the power supply control signal being a signal sent to the power supply control circuit by the indoor-unit communication circuit through the signal line;
a second loop being a loop turned on due to control of a turn-on control signal for supplying power to the at least one outdoor power supply by the power supply line; the turn-on control signal being a signal sent to the power supply control circuit by the outdoor-unit main control circuit after the at least one outdoor power supply is powered-on through the first loop; the first loop and the second loop being connected in parallel, and an impedance of the second loop being less than an impedance of the first loop; and
a trigger circuit connected to the signal line and the first loop and configured to trigger the first loop to be turned on according to the power supply control signal.

2. The air conditioner according to claim 1, wherein the second loop includes a first switch-type relay, and the first switch-type relay is configured to be turned on according to the turn-on control signal, so as to turn on the second loop.

3. The air conditioner according to claim 2, wherein the at least one indoor power supply includes:
a first power supply, an input terminal of the first power supply being connected to the live wire terminal and the neutral wire terminal of the indoor unit, an output terminal of the first power supply being connected to the indoor-unit main control circuit, and the first power supply being configured to provide the indoor-unit main control circuit with a voltage required for operation; and
a second power supply, an input terminal of the second power supply being connected to the live wire terminal and the neutral wire terminal of the indoor unit, an output terminal of the second power supply being connected to the indoor-unit communication circuit, and the second power supply being configured to provide the indoor-unit communication circuit with a voltage required for operation.

4. The air conditioner according to claim 3, wherein the second power supply includes a second switch-type relay, the second switch-type relay is disposed in a loop in which the power supply circuit supplies power to the second power supply and configured to control on/off of the loop of the second power supply due to control of the indoor-unit main control circuit.

5. The air conditioner according to claim 4, wherein the second power supply further includes a half-wave rectifier circuit, an input terminal of the half-wave rectifier circuit is connected to the power supply line, and an output terminal of the half-wave rectifier circuit is connected to the indoor-unit communication circuit.

6. The air conditioner according to claim 5, wherein the second power supply further includes a first optocoupler, a light-emitting end of the first optocoupler is disposed in the loop in which the power supply line supplies power to the second power supply, a light-receiving end of the first optocoupler is connected to the indoor-unit main control circuit, and the first optocoupler is configured to detect a zero crossing signal of an alternating current transmitted by the power supply line.

7. The air conditioner according to claim 6, wherein the indoor-unit communication circuit includes:
a second optocoupler being a communication sending terminal of the indoor unit, a light-emitting end of the second optocoupler being connected to the indoor-unit main control circuit, and a light-receiving end of the second optocoupler being connected to the output terminal of the second power supply; and
a third optocoupler being a communication receiving terminal of the indoor unit, a light-emitting end of the third optocoupler being connected to the light-receiving end of the second optocoupler and the signal line, and a light-receiving end of the third optocoupler being connected to the indoor-unit main control circuit;

wherein the indoor-unit main control circuit being further configured to control the second optocoupler to be turned on for a third preset time after delaying for a second preset time after obtaining the zero crossing signal, in a case where the second switch-type relay is turned on for a first preset time.

8. The air conditioner according to claim 6, wherein
the at least one outdoor power supply includes a third power supply, an output terminal of the third power supply is connected to the outdoor-unit main control circuit, a first input terminal of the third power supply is connected to the neutral wire of the power supply line, and a second input terminal of the third power supply is connected to the first loop;
the first loop includes a thyristor, a gate of the thyristor is connected to the trigger circuit, a first electrode of the thyristor is connected to the live wire of the power supply line, a second electrode of the thyristor is connected to the second input terminal of the third power supply, and the thyristor is configured to be turned on due to control of a trigger signal of the trigger circuit.

9. The air conditioner according to claim 8, wherein the trigger circuit includes:
a triac optocoupler, a light-receiving end of the triac optocoupler being connected to the gate of the thyristor, and the triac optocoupler being configured to be turned on according to the power supply control signal, so as to trigger the first loop to be turned on;
a triode, a base electrode of the triode being connected to the signal line and a light-receiving end of a fourth optocoupler, a collector electrode of the triode being connected to a light-emitting end of the triac optocoupler, and an emitter electrode of the triode being connected to the neutral wire of the power supply line; and
the fourth optocoupler, a light-emitting end of the fourth optocoupler being connected to the outdoor-unit main control circuit, the light-receiving end of the fourth optocoupler being connected to the neutral wire of the power supply line and the signal line, and the fourth optocoupler being configured to be turned on due to control of the outdoor-unit main control circuit after the outdoor unit is powered-on, so as to turned off the triode and the triac optocoupler.

10. The air conditioner according to claim 9, wherein the trigger circuit further includes a first resistor, the first resistor is connected between the light-receiving end of the fourth optocoupler and the signal line, a resistance value of the first resistor is greater than or equal to a preset value, and the first resistor is configured to bias a voltage of the base electrode of the triode and limit a current flowing into the fourth optocoupler.

11. The air conditioner according to claim 8, wherein the trigger circuit includes:
a triac optocoupler, a light-receiving end of the triac optocoupler being connected to the gate of the thyristor, and the triac optocoupler being configured to be turned on according to the power supply control signal, so as to trigger the first loop to be turned on;
a normally closed changeover-type relay, an end of a coil of the normally closed changeover-type relay being connected to a reference voltage terminal of the outdoor unit, and another end of the coil of the normally closed changeover-type relay being connected to the outdoor-unit main control circuit, a movable contact of the normally closed changeover-type relay being connected to the signal line, a normally closed contact of the normally closed changeover-type relay being connected to a light-emitting end of the triac optocoupler, and a normally open contact of the normally closed changeover-type relay being connected to the outdoor-unit communication circuit, and the normally closed changeover-type relay being configured to switch the movable contact from being connected with the normally closed contact to being connected with the normally open contact due to control of the outdoor-unit main control circuit after the outdoor unit is powered-on, so as to connect the signal line with the outdoor-unit communication circuit and disconnect the signal line with the trigger circuit.

12. The air conditioner according to claim 11, wherein a voltage of the reference voltage terminal is supplied by the third power supply.

13. The air conditioner according to claim 6, wherein the second power supply further includes a second resistor, the second resistor is connected in parallel with the light-emitting end of the first optocoupler, and the second resistor is configured to limit a voltage of the light-emitting end of the first optocoupler, so as to protect the light-emitting end of the first optocoupler.

14. The air conditioner according to claim 5, wherein
the at least one outdoor power supply includes:
a third power supply, an output terminal of the third power supply being connected to the outdoor-unit main control circuit, a first input terminal of the third power supply being connected to the neutral wire of the power supply line, and a second input terminal of the third power supply being connected to the first loop; and
a fourth power supply, an input terminal of the fourth power supply being connected to the live wire of the power supply line, and an output terminal of the fourth power supply being connected to an end of a coil of a third switch-type relay;
the first loop includes the third switch-type relay, another end of the coil of the third switch-type relay is connected to an output terminal of the trigger circuit, an end of the third switch-type relay is connected to the live wire of the power supply line, and another end of the third switch-type relay is connected to the second input terminal of the third power supply, the third switch-type relay is configured to be turned on due to control of a trigger signal of the trigger circuit.

15. The air conditioner according to claim 14, wherein the trigger circuit includes:
a field effect transistor, a gate of the field effect transistor being connected to the signal line, a first electrode of the field effect transistor being connected to the neutral wire of the power supply line, a second electrode of the field effect transistor being connected to the another end of the coil of the third switch-type relay, and the field effect transistor being configured to be turned on according to the power supply control signal, so as to trigger the first loop to be turned on; and
a fourth optocoupler, a light-emitting end of the fourth optocoupler being connected to the outdoor-unit main control circuit, a light-receiving end of the fourth optocoupler being connected to the neutral wire of the power supply line and the signal line, and the fourth optocoupler being configured to be turned on due to control of the outdoor-unit main control circuit after the outdoor unit is powered-on, so as to turn off the field effect transistor.

16. The air conditioner according to claim 15, wherein the field effect transistor includes a metal-oxide-semiconductor field effect transistor.

17. The air conditioner according to claim 15, wherein the trigger circuit further includes a third resistor, the third resistor is connected between the gate of the field effect transistor and the signal line, and the third resistor is configured to limit a current of the gate of the field effect transistor.

18. The air conditioner according to claim 17, wherein the trigger circuit further includes a first resistor, the first resistor is connected between the light-receiving end of the fourth optocoupler and the third resistor, a resistance value of the first resistor is greater than or equal to a preset value, and the first resistor is configured to limit a current flowing into the fourth optocoupler.

19. The air conditioner according to claim 2, wherein the outdoor-unit main control circuit is further configured to send the turn-on control signal after the first loop is turned on for a fourth preset time.

20. The air conditioner according to claim 2, wherein the outdoor-unit main control circuit is further configured to:
control the first switch-type relay to be turned off, if the indoor-unit communication circuit stops sending signals, after delaying a fifth preset time after receiving a shutdown signal sent by the indoor-unit communication circuit; and
control a second switch-type relay to be turned off, if determining that the outdoor-unit communication circuit receives the shutdown signal, after sending the shutdown signal.

* * * * *